(12) United States Patent
Kobayashi et al.

(10) Patent No.: US 11,230,033 B2
(45) Date of Patent: Jan. 25, 2022

(54) EXTRUDER SCREW INCLUDING CONVEYANCE PORTIONS AND PATHS WITHIN THE CONVEYANCE PORTIONS, EXTRUDER, AND EXTRUSION METHOD

(71) Applicant: Toshiba Kikai Kabushiki Kaisha, Tokyo (JP)

(72) Inventors: Akiyoshi Kobayashi, Fuji (JP); Shigeyuki Fujii, Numazu (JP); Takafumi Sameshima, Mishima (JP)

(73) Assignee: Shibaura Machine Co., Ltd., Tokyo (JP)

( * ) Notice: Subject to any disclaimer, the term of this patent is extended or adjusted under 35 U.S.C. 154(b) by 810 days.

(21) Appl. No.: 15/795,535

(22) Filed: Oct. 27, 2017

(65) Prior Publication Data
US 2018/0093234 A1 Apr. 5, 2018

Related U.S. Application Data

(63) Continuation of application No. PCT/JP2016/062279, filed on Apr. 18, 2016.

(30) Foreign Application Priority Data

Apr. 28, 2015 (JP) .............................. JP2015-091352

(51) Int. Cl.
*B29B 7/42* (2006.01)
*B29B 7/48* (2006.01)
(Continued)

(52) U.S. Cl.
CPC ............ *B29B 7/42* (2013.01); *B01F 7/00416* (2013.01); *B01F 15/06* (2013.01); *B29B 7/421* (2013.01);
(Continued)

(58) Field of Classification Search
CPC ........... B29B 7/489; B29B 7/847; B29B 7/82; B29B 7/90; B29B 7/845; B29B 7/42;
(Continued)

(56) References Cited

U.S. PATENT DOCUMENTS 3,305,894 A 2/1967 Gerhard et al.
3,371,379 A * 3/1968 Reifenhauser ........ B29C 48/766
96/196

(Continued)

FOREIGN PATENT DOCUMENTS

CN 87102748 11/1987
CN 1382573 12/2002
(Continued)

OTHER PUBLICATIONS

Office Action in DE Application No. 112015001938.3 dated Jul. 26, 2019.
(Continued)

*Primary Examiner* — Charles Cooley
(74) *Attorney, Agent, or Firm* — DLA Piper LLP US

(57) ABSTRACT

At a part of the screw main body at which the kneading portion is provided, conveyance portions, a barrier portion and a path are provided at a plurality of places. At least one of the places, the path is provided inside the screw main body, and includes an entrance and an exit. The entrance is opened in such a manner that the raw material whose pressure is enhanced by being restricted in conveyance by the barrier portion flows into the entrance. The path is formed in such a manner that the raw material flowing into the path from the entrance flows toward the exit in a direction opposite to the direction of conveyance.

18 Claims, 13 Drawing Sheets

(51) Int. Cl.
| | |
|---|---|
| *B29B 7/72* | (2006.01) |
| *B29C 48/505* | (2019.01) |
| *B29C 48/25* | (2019.01) |
| *B29C 48/67* | (2019.01) |
| *B29C 48/51* | (2019.01) |
| *B29B 7/82* | (2006.01) |
| *B29K 101/12* | (2006.01) |
| *B29K 105/00* | (2006.01) |
| *B01F 7/00* | (2006.01) |
| *B01F 15/06* | (2006.01) |

(52) U.S. Cl.
CPC .............. *B29B 7/429* (2013.01); *B29B 7/482* (2013.01); *B29B 7/483* (2013.01); *B29B 7/489* (2013.01); *B29B 7/726* (2013.01); *B29C 48/2564* (2019.02); *B29C 48/25682* (2019.02); *B29C 48/507* (2019.02); *B29C 48/51* (2019.02); *B29C 48/67* (2019.02); *B01F 2015/061* (2013.01); *B01F 2215/0049* (2013.01); *B29B 7/823* (2013.01); *B29K 2101/12* (2013.01); *B29K 2105/251* (2013.01)

(58) Field of Classification Search
CPC ....... B29B 7/421; B29B 7/823; B29B 7/7485; B29B 7/7461; B29B 7/429; B29B 7/482; B29B 7/422; B29B 7/726; B29B 7/483; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29C 48/2564; B29C 48/507; B29C 48/53; B29C 48/575; B29C 48/57; B29C 48/25682; B29C 48/268; B29C 48/67; B29K 2105/251; B29K 2023/12; B29K 2509/00; B29K 2101/12; B01F 7/00416; B01F 15/06; B01F 2015/061; B01F 2215/0049
USPC .............................. 425/200–209; 366/79–91
See application file for complete search history.

(56) References Cited

U.S. PATENT DOCUMENTS

| | | | | |
|---|---|---|---|---|
| 3,503,944 A * | 3/1970 | Heinrich | ................. | B29C 48/72 526/88 |
| 3,712,594 A * | 1/1973 | Schippers | ............. | B29C 48/505 366/75 |
| 3,746,318 A * | 7/1973 | Schippers | ................. | B29B 7/42 366/79 |
| 3,799,234 A | 3/1974 | Skidmore | | |
| 3,924,842 A * | 12/1975 | Klein | .................... | B29C 48/395 366/79 |
| 3,963,558 A | 6/1976 | Skidmore | | |
| 3,999,921 A * | 12/1976 | Thor | ........................ | B29B 7/42 425/208 |
| 4,169,679 A | 10/1979 | Miller et al. | | |
| 4,290,702 A * | 9/1981 | Klein | .................... | B29C 45/50 366/77 |
| 4,302,409 A | 11/1981 | Miller et al. | | |
| 4,329,313 A | 5/1982 | Miller et al. | | |
| 4,387,997 A * | 6/1983 | Klein | .................... | B29C 45/50 366/79 |
| 4,423,960 A * | 1/1984 | Anders | ................. | B29C 48/395 366/75 |
| 4,472,059 A * | 9/1984 | Klein | .................... | B29C 48/51 366/79 |
| 4,637,790 A * | 1/1987 | Klein | ................. | B29C 48/51 425/208 |
| 4,802,140 A * | 1/1989 | Dowling | .................. | B29B 7/42 366/79 |
| 4,902,455 A | 2/1990 | Wobbe | | |
| 4,959,186 A | 9/1990 | Dollhopf | | |
| 4,983,114 A | 1/1991 | Hauck | | |
| 5,102,594 A | 4/1992 | Burlet et al. | | |
| 5,358,681 A | 10/1994 | Jerman et al. | | |
| 5,499,870 A | 3/1996 | Rockstedt | | |
| 5,804,111 A * | 9/1998 | Kobayashi | .............. | B29C 48/38 264/40.5 |
| 6,024,479 A | 2/2000 | Haring | | |
| 8,048,948 B2 | 11/2011 | Shimizu et al. | | |
| 8,975,336 B2 | 3/2015 | Shimizu et al. | | |
| 9,199,393 B2 * | 12/2015 | Shimizu | .................. | B29B 7/728 |
| 10,967,554 B2 | 4/2021 | Kobayashi | ............. | B29C 48/51 |
| 11,072,104 B2 * | 7/2021 | Kobayashi | ............. | B29C 48/51 |
| 2002/0186612 A1 | 12/2002 | Murakami et al. | | |
| 2004/0222543 A1 | 11/2004 | Innerebner et al. | | |
| 2004/0238990 A1 | 12/2004 | Hermann et al. | | |
| 2005/0087904 A1 | 4/2005 | Bryan | | |
| 2006/0108706 A1 | 5/2006 | Galimberti | | |
| 2016/0303766 A1 | 6/2016 | Kobayashi | | |
| 2016/0332331 A1 * | 11/2016 | Kobayashi | ............. | B29B 7/483 |
| 2016/0332332 A1 * | 11/2016 | Kobayashi | ............. | B29C 48/54 |
| 2017/0021547 A1 * | 1/2017 | Kobayashi | ................ | B29B 7/82 |
| 2017/0050366 A1 * | 2/2017 | Kobayashi | ................ | B29B 7/82 |
| 2017/0050367 A1 * | 2/2017 | Kobayashi | ............. | B29C 48/67 |
| 2017/0113394 A1 * | 4/2017 | Kobayashi | ............. | B29B 7/429 |
| 2017/0225360 A1 * | 8/2017 | Kobayashi | ............. | B29B 7/823 |
| 2017/0225379 A1 * | 8/2017 | Kobayashi | ............. | B29B 7/487 |
| 2018/0093233 A1 * | 4/2018 | Kobayashi | ............. | B01F 15/06 |
| 2018/0093234 A1 * | 4/2018 | Kobayashi | ............. | B29B 7/421 |
| 2019/0352472 A1 * | 11/2019 | Sameshima | ............ | B29C 48/16 |
| 2020/0282622 A1 | 9/2020 | Ougier | | |
| 2021/0154906 A1 * | 5/2021 | Kobayashi | ............. | B29C 48/51 |

FOREIGN PATENT DOCUMENTS

| | | |
|---|---|---|
| CN | 101973121 | 2/2011 |
| CN | 103068540 | 4/2013 |
| DE | 2040919 A | 2/1972 |
| DE | 2454785 * | 5/1976 |
| DE | 2454785 A | 5/1976 |
| DE | 25 48 490 | 5/1977 |
| DE | 694 17 466 | 12/1999 |
| EP | 0 688 600 | 12/1995 |
| EP | 2 578 378 | 4/2013 |
| EP | 3650196 A1 * | 5/2020 |
| GB | 1175127 | 12/1969 |
| GB | 1 501 412 | 2/1978 |
| JP | 48-61153 | 8/1973 |
| JP | 50-143863 | 11/1975 |
| JP | 52-72573 | 5/1977 |
| JP | S52-72573 | 5/1977 |
| JP | 56-037054 | 8/1981 |
| JP | S57-034936 | 2/1982 |
| JP | 57-041932 | 3/1982 |
| JP | 57-107826 | 7/1982 |
| JP | S57-163547 | 10/1982 |
| JP | 58-025943 | 2/1983 |
| JP | 59-184635 | 10/1984 |
| JP | H01-320129 | 12/1989 |
| JP | 5-220818 | 8/1993 |
| JP | H06-170920 | 6/1994 |
| JP | 07-088923 | 4/1995 |
| JP | 7-227836 | 8/1995 |
| JP | H09-504755 | 5/1997 |
| JP | 2002-321214 | 11/2002 |
| JP | 2004-529018 | 9/2004 |
| JP | 2005-169764 | 6/2005 |
| JP | 2005-313608 | 11/2005 |
| JP | 2008-302555 | 12/2008 |
| JP | 2009-045804 | 3/2009 |
| JP | 2010-069771 | 4/2010 |
| JP | 2010-105285 | 5/2010 |
| JP | 2010-137405 | 6/2010 |
| JP | 2011-020341 | 2/2011 |

(56) References Cited

FOREIGN PATENT DOCUMENTS

| | | | | |
|---|---|---|---|---|
| JP | 2011-046104 | 3/2011 | | |
| JP | 2011-083976 | 4/2011 | | |
| JP | 2011-116025 | 6/2011 | | |
| JP | 2012-051289 | 3/2012 | | |
| JP | 2013-071428 | 4/2013 | | |
| JP | 2013-123841 | 6/2013 | | |
| JP | 53-69614 | 12/2013 | | |
| JP | 2014-019045 | 2/2014 | | |
| KR | 2002-0082788 | 10/2002 | | |
| KR | 10-0401578 | 8/2004 | | |
| KR | 10-2010-0087738 | 8/2010 | | |
| SU | 889462 A2 * | 12/1981 | ............ | B29C 48/51 |
| WO | WO 2010/061872 | 6/2010 | | |
| WO | WO 2012/029271 | 3/2012 | | |
| WO | WO 2013/133453 | 9/2013 | | |
| WO | WO-2013133453 A1 * | 9/2013 | ............ | B29C 48/64 |
| WO | WO 2015/163197 | 10/2015 | | |
| WO | WO 2015/170617 | 11/2015 | | |
| WO | WO-2020025446 A1 * | 2/2020 | ............ | B33Y 40/10 |

OTHER PUBLICATIONS

German Office Action issued in DE Application No. 11 2015 002 161.2 dated Aug. 8, 2019.
International Search Report (with English Translation) issued in PCT/JP2015/061874 dated Jul. 7, 2015.
Written Opinion (with English Translation) issued in PCT/JP2015/061874 dated Jul. 7, 2015.
International Preliminary Report on Patentability issued in PCT/JP2015/061874 dated Nov. 8, 2016 .
International Search Report (with English Translation) issued in PCT/JP2015/062549 dated Jul. 21, 2015.
Written Opinion (with English Translation) issued in PCT/JP2015/062549 dated Jul. 21, 2015.
International Preliminary Report on Patentability issued in PCT/JP2015/062549 dated Nov. 8, 2016.
International Search Report (with English Translation) issued in PCT/JP2015/062566 dated Jul. 21, 2015.
Written Opinion (with English Translation) issued in PCT/JP2015/062566 dated Jul. 21, 2015.
International Preliminary Report on Patentability issued in PCT/JP2015/062566 dated Nov. 8, 2016 .
Taiwanese Office Action (with English Translation) issued in TW 104114405 dated Jun. 16, 2016.
Taiwanese Office Action (with English Translation) issued in TW 104114406 dated Jun. 16, 2016.
Chinese Office Action (with English Translation) issued in CN 2015-80005725.2 dated Apr. 24, 2017.
Korean Office Action issued in KR 10-2016-7019779 dated Nov. 27, 2017.
Chinese Office Action issued in CN 2015-80023951.3 dated Mar. 30, 2018.
Chinese Office Action issued in CN 2015-80024101.5 dated Apr. 2, 2018.
Xiaozheng, Geng "Plastics Mixing & Continuous Mixing Equipment", China Light Industry Press, pp. 349-353, Jan. 31, 2008.
Korean Office Action issued in KR 2016-7033989 dated Jul. 16, 2018.
Korean Office Action issued in KR 2016-7033993 dated Aug. 2, 2018.
Japanese Office Action issued in JP Application No. 2015-082775 dated May 7, 2019.
Office Action in CN Application No. 201680024052X dated Jul. 22, 2019.
International Search Report issued in International Application No. PCT/JP2015/060641 dated May 26, 2015.
International Search Report issued in International Application No. PCT/JP2015/061487 dated Jul. 7, 2015.
International Search Report issued in International Application No. PCT/JP2016/062278 dated Jul. 12, 2016.
International Search Report issued in International Application No. PCT/JP2016/062279 dated Jul. 12, 2016.
Written Opinion issued in International Application No. PCT/JP2015/060641 dated May 26, 2015.
Written Opinion issued in International Application No. PCT/JP2015/061487 dated Jul. 7, 2015.
Written Opinion issued in International Application No. PCT/JP2016/062278 dated Jul. 12, 2016.
Written Opinion issued in International Application No. PCT/JP2016/062279 dated Jul. 12, 2016.
Taiwan Office Action issued in Taiwan Application No. 104112230 dated Sep. 2, 2016.
Taiwan Office Action issued in Taiwan Application No. 104112709 dated Sep. 2, 2016.
Chinese Office Action issued in Chinese Application No. 201580007088.2 dated Mar. 3, 2017.
Chinese Office Action issued in Chinese Application No. 201580007825.9 dated Mar. 24, 2017.
Korean Office Action issued in KR 10-2016-7021148 dated Nov. 29, 2017.
English Language Abstract of JP 7-227836 published Aug. 29, 1995.
English Language Abstract of JP 2010-137405 published Jun. 24, 2010.
English Language Abstract of JP 2013-123841 published Jun. 24, 2013.
English Language Abstract of JP 57-041932 published Mar. 9, 1982.
English Language Abstract of KR 10-2010-0087738 published Aug. 5, 2010.
German Office Action in DE Application No. 11 2015 002 164.7, dated Jun. 23, 2020.
U.S. Appl. No. 15/221,293.
U.S. Appl. No. 15/221,277.
U.S. Appl. No. 15/345,711.
U.S. Appl. No. 15/795,534.

* cited by examiner

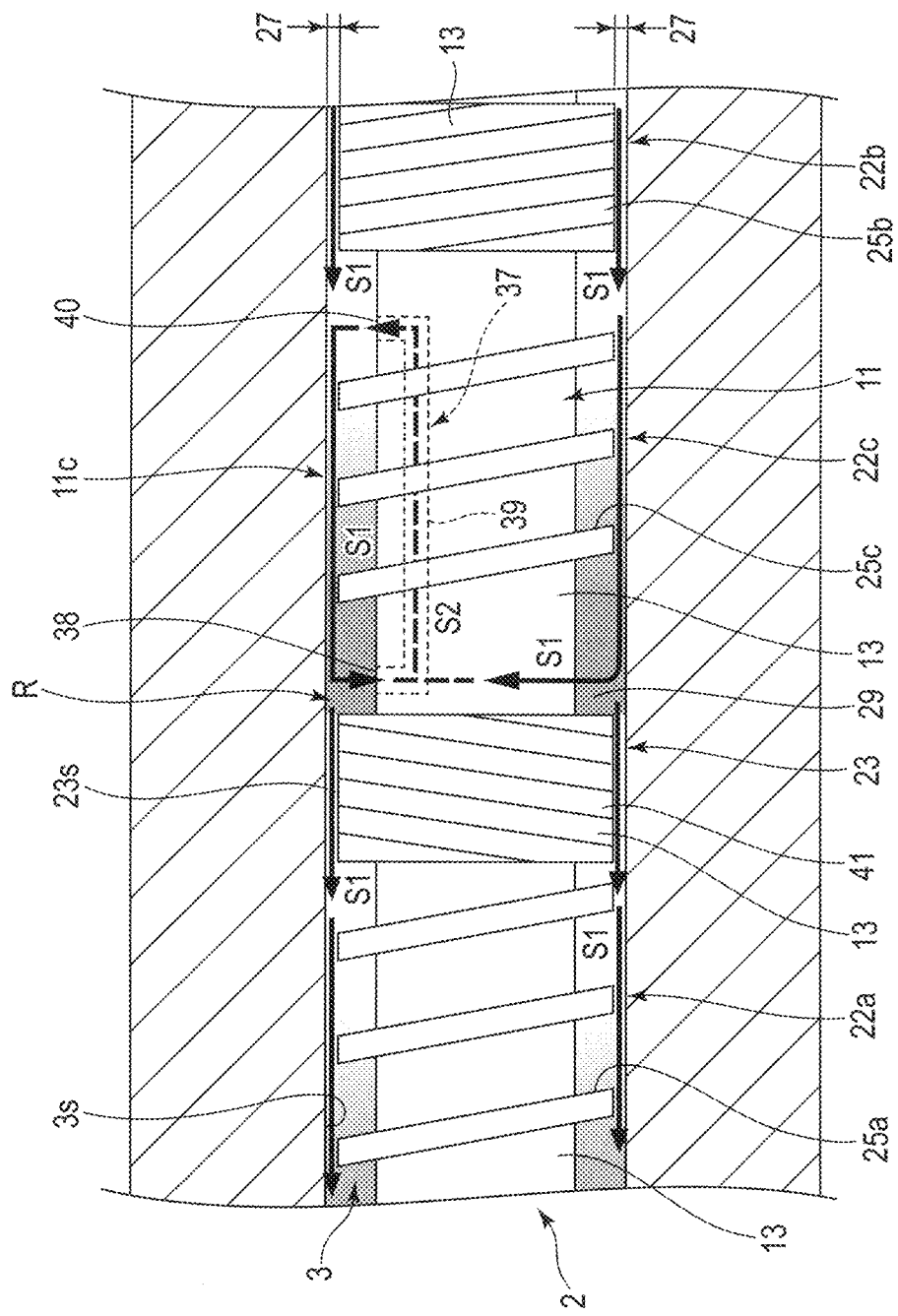
F I G. 8

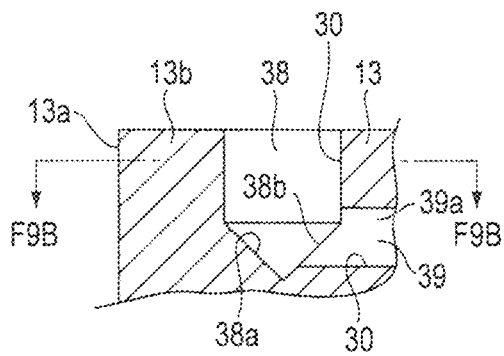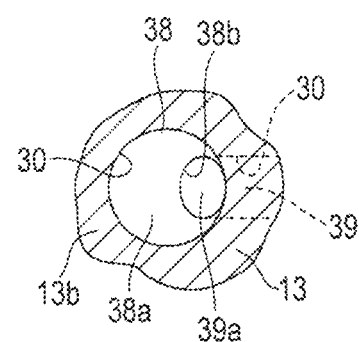
FIG. 9(A)     FIG. 9(B)
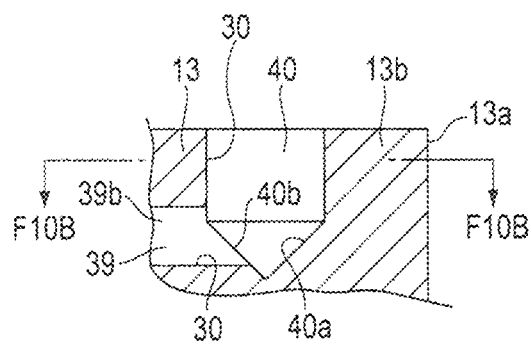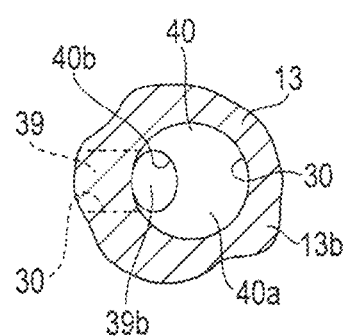
FIG. 10(A)     FIG. 10(B)

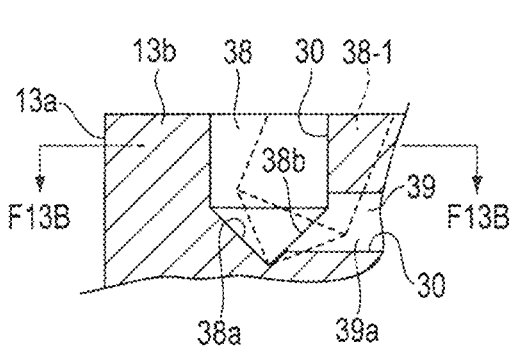 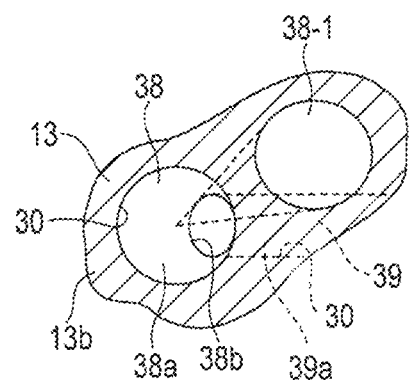
FIG. 13(A)　　　　　　　FIG. 13(B)
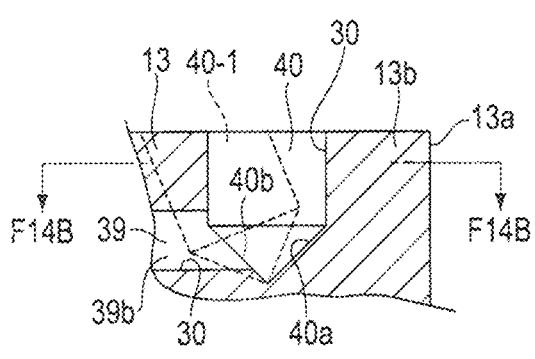 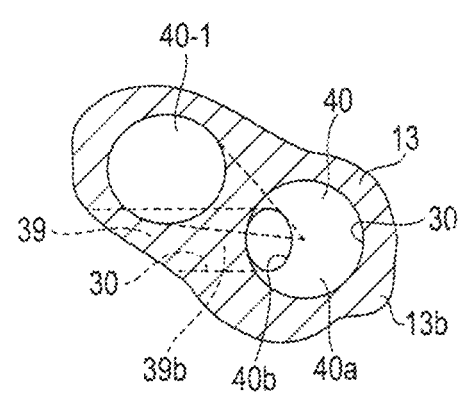
FIG. 14(A)　　　　　　　FIG. 14(B)

EXTRUDER SCREW INCLUDING CONVEYANCE PORTIONS AND PATHS WITHIN THE CONVEYANCE PORTIONS, EXTRUDER, AND EXTRUSION METHOD

CROSS-REFERENCE TO RELATED APPLICATIONS

This application is a Continuation Application of PCT Application No. PCT/JP2016/062279, field Apr. 18, 2016 and based upon and claiming the benefit of priority from prior Japanese Patent Application No. 2015-091352, filed Apr. 28, 2015, the entire contents of all of which are incorporated herein by reference.

BACKGROUND OF THE INVENTION

1. Field of the Invention

The present invention relates to an extrusion technique capable of improving the degree of kneading without lengthening an extruder (screw).

2. Description of the Related Art

Heretofore, an extrusion technique for improving the degree of kneading by utilizing "stretching action" imparted to the raw material when the raw material passes from a large part through a small part is known. For example, in Patent Literature 1 and Patent Literature 2, an extrusion technique in which a stretch imparting mechanism configured to impart stretching action to the raw material is added to a leading end of the extruder (screw) is disclosed. Furthermore, in Patent Literature 3, an extrusion technique in which a stretch imparting region configured to augment a flow having a high degree of stretch is secured between a pair of screws provided with spiral flights is disclosed.

CITATION LIST

Patent Literature

Patent Literature 1: JP H07-227836 A
Patent Literature 2: JP 2010-137405 A
Patent Literature 3: JP 2013-123841 A

BRIEF SUMMARY OF THE INVENTION

However, in the extrusion technique disclosed in Patent Literature 1 and Patent Literature 2, the whole of the extruder is lengthened by a length corresponding to the addition of the stretch imparting mechanism. Particularly, in the paragraph "0027" of Patent Literature 2, a description "the raw material is made to pass through a gap between surfaces opposed parallel to each other a plurality of times, whereby stretching action is imparted to the raw material" is given. Accordingly, in order to realize such description content, further lengthening of the whole extruder is inevitable.

Further, in the extrusion technique of Patent Literature 3, as the raw material to be conveyed by a pair of screws, part of the raw material flowing along the spiral flight while avoiding the stretch imparting region exists besides the part of the raw material passing through the stretch imparting region. Accordingly, in the extrusion technique of Patent Literature 3, there is some question as to whether or not all of the raw material conveyed by the pair of screws passes through the stretch imparting region without any omission. In this case, in order to make all of the raw material pass through the stretch imparting region without any omission, it is necessary to secure the stretch imparting region sufficiently long. However, if the stretch imparting region is secured sufficiently long, the extruder (screw) is lengthened by a length corresponding to the elongation of the stretch imparting region.

Thus, an object of the present invention is to provide an extrusion technique for imparting stretching action to all of the raw material to be conveyed by a screw without any omission, and improving the degree of kneading of the raw material without lengthening the extruder (screw) by making the screw itself possess a function of imparting stretching action to the raw material.

In order to achieve the object of the invention, an extruder screw comprises a transfer portion configured to continuously convey supplied materials; a melting and mixing portion configured to continuously melt and mix the conveyed materials; and a kneading portion configured to continuously knead a raw material obtained by melting and mixing the materials, wherein the transfer portion, the melting and mixing portion, and the kneading portion are provided on a screw main body rotating around a linear axis line, at a part of the screw main body at which the kneading portion is provided, a conveyance portion configured to convey the raw material, a barrier portion configured to restrict conveyance of the raw material, and a path through which the raw material flows are provided at each of a plurality of places, at least one of the places, the path is provided inside the screw main body, and includes an entrance and an exit, the entrance is opened at an outer circumferential surface of the screw main body at the conveyance portion in such a manner that the raw material pressure of which is enhanced by being restricted in conveyance by the barrier portion flows into the entrance, the path is formed in such a manner that the raw material flowing into the path from the entrance flows toward the exit in a direction opposite to the direction of conveyance carried out by the conveyance portion, and the exit is opened at a position in the conveyance portion in which the entrance is opened on the upstream side of the entrance in the conveyance direction on the circumferential surface of the screw main body.

Further, an extruder comprising the above-described extruder screw, comprises a barrel including a cylinder in which the extruder screw is rotatably inserted; a supply port provided on the barrel, and configured to supply materials to the inside of the cylinder; and a discharge port which is provided on the barrel, and from which kneaded stuff created by the screw is continuously extruded.

Furthermore, an extrusion method comprises: kneading a raw material by using the above-described extruder screw; the method comprising continuously creating kneaded stuff of the raw material; and extruding the kneaded stuff, wherein in a kneading portion, while the kneaded stuff is continuously extruded, the raw material conveyed along an outer circumferential surface of a screw main body flows through a path, and thereafter returns to the outer circumferential surface of the screw.

According to the present invention, a screw itself is made to possess a function of imparting stretching action to the raw material, whereby it is possible to realize an extrusion technique for imparting stretching action to all of the raw material to be conveyed by the screw without any omission, and improving the degree of kneading of the raw material without lengthening the extruder (screw).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a cross-sectional view showing the fluidized state of the raw material in the cylinder of the extruder in a partially enlarging manner.

FIG. 9 (A) is a cross-sectional view showing the configuration of an entrance part of the path in an enlarging manner in a modification example of the present invention, and FIG. 9 (B) is a cross-sectional view along line F9B-F9B in FIG. 9 (A).

FIG. 10 (A) is a cross-sectional view showing the configuration of an exit part of the path in an enlarging manner in the modification example of the present invention, and FIG. 10 (B) is a cross-sectional view along line F10B-F10B in FIG. 10 (A).

FIG. 13 (A) is a cross-sectional view showing the configuration of an entrance part of the path in an enlarging manner in a modification example of the present invention, and FIG. 13 (B) is a cross-sectional view along line F13B-F13B in FIG. 13 (A).

FIG. 14 (A) is a cross-sectional view showing the configuration of an exit part of the path in an enlarging manner in the modification example of the present invention, and FIG. 14 (B) is a cross-sectional view along line F14B-F14B in FIG. 14 (A).

DETAILED DESCRIPTION OF THE INVENTION

Hereinafter, an embodiment of the present invention will be described with reference to the accompanying drawings.

Figure 1:
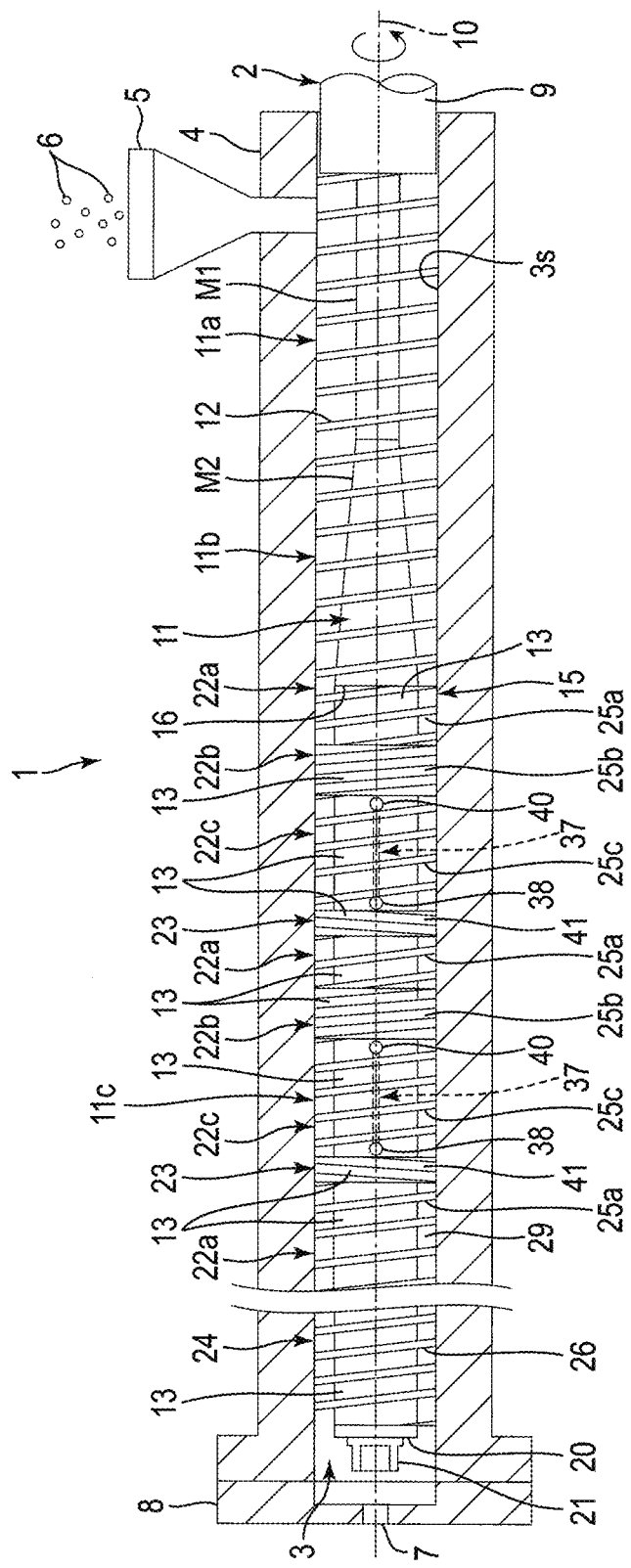
FIG. 1 is a longitudinal cross-sectional view in which the external configuration of an extruder screw is shown in the overall configuration of a single-screw extruder according to an embodiment of the present invention.
Figure 2:
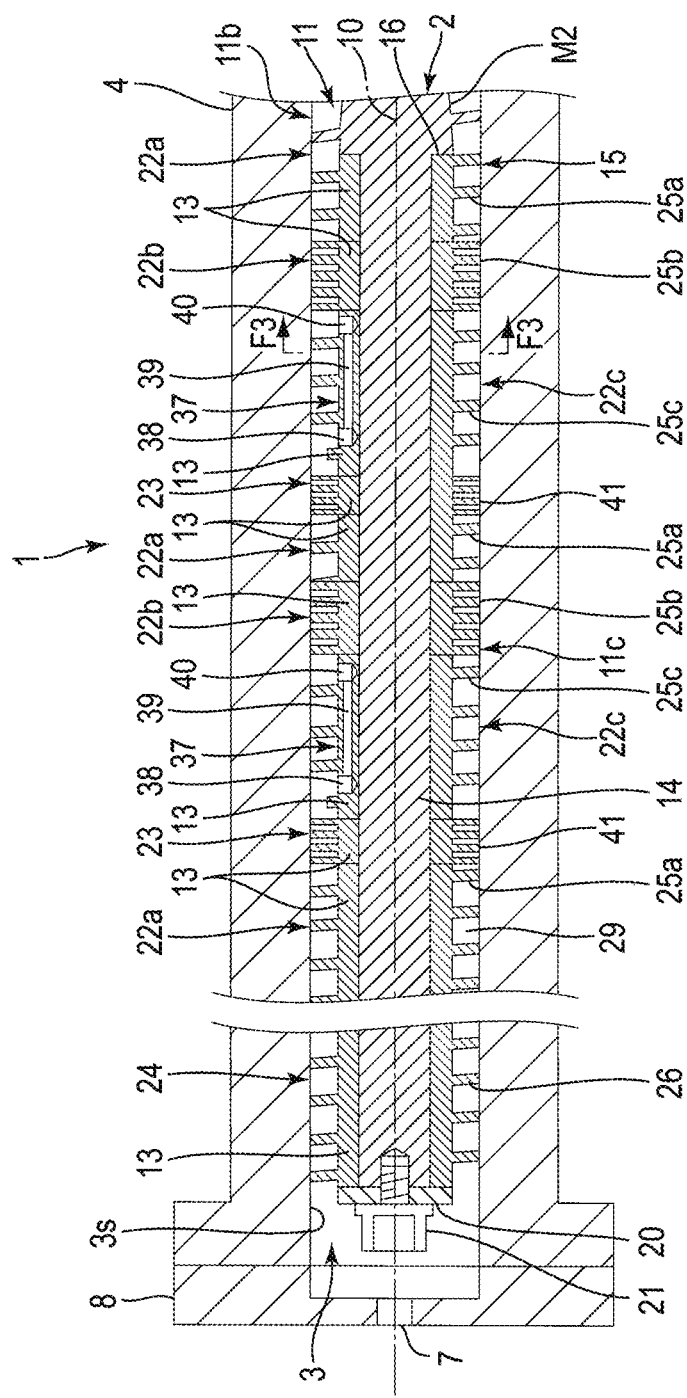
FIG. 2 is a longitudinal cross-sectional view in which an internal configuration of the extruder screw in a kneading portion in the single-screw extruder according to the embodiment of the present invention is shown.

In FIG. 1 and FIG. 2, the configuration of a single-screw extruder 1 according to this embodiment is shown. The single-screw extruder 1 is provided with one extruder screw 2, and barrel 4 including a cylinder 3 in which the screw 2 is rotatably inserted.

The barrel 4 is provided with a supply port 5 configured to supply a plurality of types of materials 6 such as a thermoplastic resin and the like at one end thereof. The supply port 5 penetrates the barrel 4 to communicate with the cylinder 3. Further, the barrel 4 is provided with a discharge port 7 at the other end thereof. The discharge port 7 is formed in a lid body 8 to be coupled to the barrel 4 to cover the opening of the other end of the barrel 4. From the discharge port 7, the kneaded stuff created by the extruder screw 2 is continuously extruded.

Furthermore, the barrel 4 is provided with a coolant passage through which cooling water is made to flow, heater, temperature sensor, and the like (all of which are not shown). By controlling the heater to heat the barrel 4 to a set temperature, it is possible to heat the inside of the cylinder 3. When the temperature of the barrel 4 exceeds the set temperature, cooling water is made to flow through the coolant passage to cool the barrel 4, whereby the inside of the cylinder 3 can be cooled to the set temperature.

The extruder screw 2 extends straight from the base end thereof to the leading end thereof, and the total length thereof is set to a length corresponding to the total length of the cylinder 3 of the barrel 4. Thereby, the extruder screw 2 can be arranged in such a manner that the screw 2 is rotatably inserted in the cylinder 3 of the barrel 4. In a state where the extruder screw 2 is rotatably inserted in the cylinder 3 of the barrel 4, the base end of the extruder screw 2 is positioned on one end side of the barrel 4 on which the supply port 5 is provided, and leading end of the extruder screw 2 is positioned on the other end side of the barrel 4 on which the discharge port 7 is provided.

At the base end of the extruder screw 2, a stopper portion 9 is coaxially provided. The stopper portion 9 is configured to close the opening of the cylinder 3 on the base end side of extruder screw 2 in a state where the extruder screw 2 is rotatably inserted/arranged in the cylinder 3 of the barrel 4. Thereby, it is possible to prevent the plurality of types of materials 6 to be supplied to the inside of the cylinder 3 from leaking to the outside of the extruder. The stopper portion 9 is configured to be able to be coupled to a rotating device such as a motor or the like through a coupling not shown. When the torque from the rotating device is transmitted to the stopper portion 9, the extruder screw 2 is rotated around a linear axis line 10 extending from the base end thereof to the leading end thereof.

Furthermore, the extruder screw 2 is provided with a screw main body 11 rotating together with the extruder screw 2 in an integrated manner. In the description to be given hereinafter, the rotational direction (left rotation, right rotation) of the screw main body 11 implies the rotational direction (left rotation, right rotation) of a case where the screw main body 11 is viewed from the base end side thereof, in other words, of a case where the discharge port 7 is viewed from the supply port 5 of the barrel 4. Likewise, the twisting direction (clockwise, counterclockwise) of each of flights 12, 25a, 25b, 25c, 26, and 41 implies the twisting direction (clockwise, counterclockwise) of each of the flights 12, 25a, 25b, 25c, 26, and 41 of a case where each of them is viewed from the base end side of the screw main body 11.

The screw main body 11 includes, in the order from the base end of the screw main body 11 to the leading end thereof, a transfer portion 11a, melting and mixing portion 11b, and kneading portion 11c. The transfer portion 11a continuously conveys the plurality of types of materials 6 supplied from the supply port 5 to the inside of the cylinder 3 toward the melting and mixing portion 11b. The melting and mixing portion 11b continuously melts and mixes the plurality of types of materials 6. Then, the resultant obtained by melting and mixing the plurality of types of materials 6 is continuously introduced into the kneading portion 11c as a raw material for kneading. In the kneading portion 11c, desired kneaded stuff is continuously created.

The part of the screw main body 11 at which the kneading portion 11c is provided is formed not only by arranging an area (shearing action region) for imparting shearing action to the raw material, but also by particularly arranging an area (stretching action region) for imparting stretching action to the raw material at each of a plurality of positions in the axial direction. Thereby, the degree of dispersing the raw material is improved, and as a result, it is possible to create kneaded stuff excellent in the degree of kneading. Then, the kneaded stuff created inside the cylinder 3 is continuously extruded through the discharge port 7.

On the outer circumferential surfaces M1 and M2 of the screw main body 11 from the transfer portion 11a to the melting and mixing portion 11b, a spirally twisted flight 12 is continuously formed. The flight 12 is configured to continuously convey the materials 6 to be supplied from the supply port 5 to the inside of the cylinder 3 from the transfer portion 11a to the melting and mixing portion 11b. For this reason, the flight 12 is twisted in a direction opposite to the rotational direction of the screw main body 11.

In the drawing, a flight 12 of a case where the materials 6 are conveyed by the left rotation of the screw main body 11 is shown. In this case, the twisting direction of the flight 12 is set to the clockwise direction as in the case of the right-handed screw. It should be noted that when the materials 6 are conveyed by the right rotation of the screw main body 11, it is sufficient if the twisting direction of the flight 12 is set to the counterclockwise direction as in the case of the left-handed screw.

The outer circumferential surface M1 of the screw main body 11 at the transfer portion 11a has a cylindrical shape, and the gap between the outer circumferential surface M1 thereof and inner surface 3s of the cylinder 3 is set wide. The outer circumferential surface M2 of the screw main body 11 at the melting and mixing portion 11b has a shape widen from the transfer portion 11a toward the kneading portion 11c, and the gap between the outer circumferential surface M2 thereof and inner surface 3s of the cylinder 3 is set in such a manner that the gap continuously becomes less from the transfer portion 11a toward the kneading portion 11c.

Here, in a state where the extruder screw 2 is caused to make left rotation, the materials 6 supplied from the supply port 5 to the cylinder 3 are conveyed by the flight 12 from the transfer portion 11a to the melting and mixing portion 11b. In the melting and mixing portion 11b, the materials 6 receive compression mainly from the gap continuously made less while being heated by the heater, whereby a molten and mixed raw material for kneading is formed. The raw material is continuously conveyed from the melting and mixing portion 11b to the kneading portion 11c.

The part of the screw main body 11 at which the kneading portion 11c is provided is constituted of a plurality of cylinder bodies 13 each of which has a cylindrical shape, and one rotating shaft 14 (see FIG. 2) configured to support thereon these cylinder bodies 13. Furthermore, the kneading portion 11c includes an introduction portion 15 configured to introduce the raw material conveyed from the melting and mixing portion 11b into the kneading portion 11c. The introduction portion 15 is configured to be adjacent to the end face 16 of the melting and mixing portion 11b. Details of the introduction portion 15 will be described later.

The rotating shaft 14 is provided in an area from the leading end of the screw main body 11 to the end face 16 of the melting and mixing portion 11b. The rotating shaft 14 extends straight from the base end to the leading end, and the base end thereof is coaxially connected to the end face 16 of the melting and mixing portion 11b. The rotating shaft 14 has a columnar shape, and the external profile thereof is set smaller than the external profile of the end face 16 of the melting and mixing portion 11b.

It should be noted that regarding the method of connecting the base end of the rotating shaft 14 and end face 16 of the melting and mixing portion 11b to each other, it is sufficient if one of already-existing methods such as a method of coaxially and integrally forming the rotating shaft 14 together with the screw main body 11 from the transfer portion 11a to the melting and mixing portion 11b, method of separately forming the screw main body 11 from the transfer portion 11a to the melting and mixing portion 11b and rotating shaft 14, and thereafter coaxially coupling the base end of the rotating shaft 14 to the end face 16 of the melting and mixing portion 11b, and the like is appropriately selected.

Figure 3:
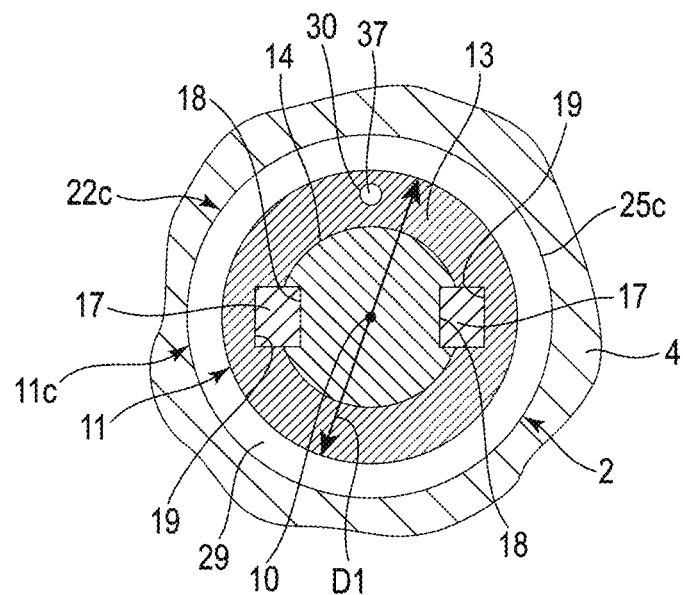
FIG. 3 is a cross-sectional view along line F3-F3 of FIG. 2.
Figure 4:
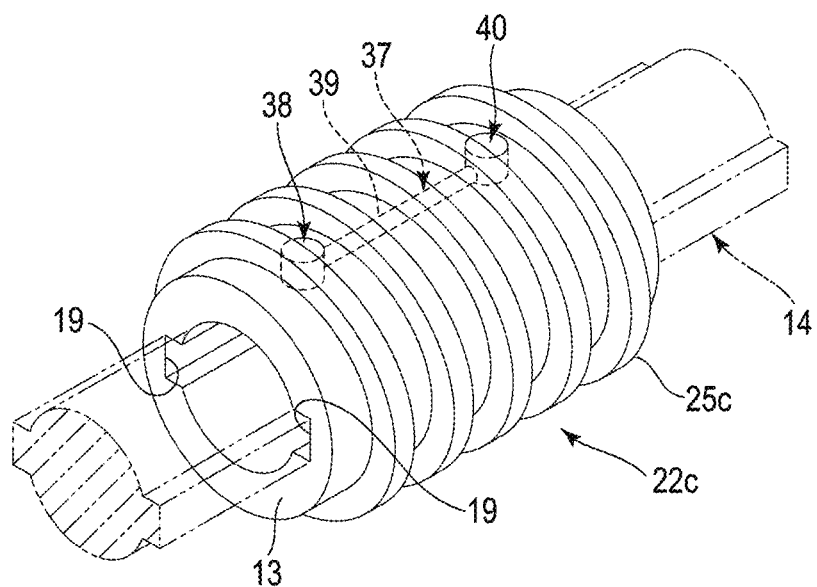
FIG. 4 is a perspective view showing a configuration example of a screw element of the extruder screw.
Figure 5:
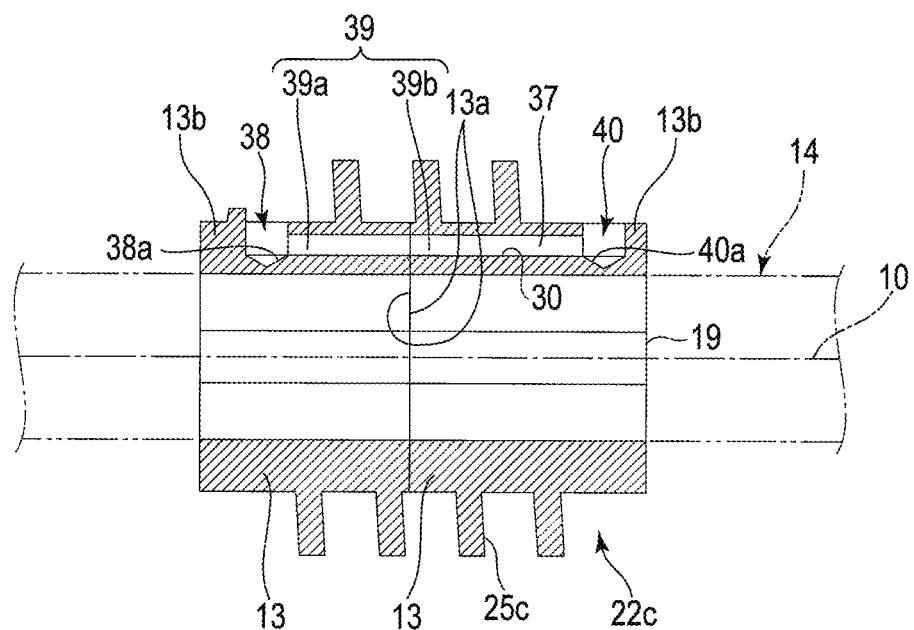
FIG. 5 is a cross-sectional view showing the configuration of a path formed to extend through two cylinder bodies in a partially enlarging manner.

As shown in FIG. 3 and FIG. 4, as an example of the supporting structure in which the plurality of cylinder bodies 13 are supported on the rotating shaft 14, the rotating shaft 14 is provided with a pair of keys 17 in the outer circumferential surface thereof. The keys 17 are fitted into a pair of groove parts 18 formed at positions shifted from each other by 180° along the outer circumferential surface of the rotating shaft 14. Each groove part 18 is formed by partially cutting away the outer circumferential surface of the rotating shaft 14 in the axial direction.

Furthermore, each cylinder body 13 is formed in such a manner that the rotating shaft 14 can be made to coaxially penetrate the cylinder body 13 along the inner circumferential surface thereof. In the inner circumferential surface of each cylinder body 13, key groves 19 are formed at positions shifted from each other by 180° in the circumferential direction. The pair of key grooves 19 is formed by partially cutting away the inner circumferential surface of the cylinder body 13 in the axial direction.

As shown in FIG. 1 through FIG. 4, the rotating shaft 14 is made to penetrate all the cylinder bodies 13 along the inner circumferential surfaces of the cylinder bodies 13 while positional alignment of each key 17 with each key groove 19 is carried out. Thereafter, a fixing screw 21 is screwed into the leading end of the rotating shaft 14 through a collar 20. At this time, all the cylinder bodies 13 are clamped between the leading end collar 20 and end face 16 of the melting and mixing portion 11b, and are held by the clamping force in a state where the cylinder bodies 13 are in close contact with each other without any gaps between them.

By the supporting structure described above, all the cylinder bodies 13 are coaxially coupled to each other on the rotating shaft 14, whereby each cylinder body 13 and rotating shaft 14 are integrally assembled. Each cylinder body 13 and rotating shaft 14 are integrally assembled, whereby the screw main body 11 is formed as a rod-like member extending from the base end to the leading end in the axial direction (longitudinal direction).

Thereby, it becomes possible to rotate each cylinder body 13 together with the rotating shaft 14 around the axis line 10, i.e., to rotate the screw main body 11 around the axis line 10. Furthermore, the base end of the screw main body 11 coincides with the base end of the rotating shaft 14, and the leading end of the screw main body 11 coincides with the leading end of the rotating shaft 14. In other words, the base end of the screw main body 11 coincides with the base end of the extruder screw 2 corresponding to one end of the barrel 4, and the leading end of the screw main body 11 coincides with the leading end of the extruder screw 2 corresponding to the other end of the barrel 4.

At this time, at the part of the screw main body 11 at which the kneading portion 11c is provided, each cylinder body 13 becomes a constituent element defining the outer diameter D1 (see FIG. 3) of the screw main body 11. In the kneading portion 11c, regarding the cylinder bodies 13 coaxially coupled to each other along the rotating shaft 14, their outer diameters D1 are set identical to each other. The outer diameter D1 of the screw main body 11 (each cylinder body 13) is a diameter to be defined coaxially with the axis line 10 which is a rotational center of the rotating shaft 14.

Thereby, a segment type screw 2 in which the outer diameter D1 of the screw main body 11 (each cylinder body 13) at the kneading portion 11c has a fixed value is formed. The segment type screw 2 can hold a plurality of screw elements in an arbitrary order and combination along the rotating shaft 14. Regarding the screw element, for example, a cylinder body 13 on which at least part of each of the flights 12, 25a, 25b, 25c, 26, and 41 to be described later is formed can be defined as one screw element.

By segmenting the screw 2, it is possible to, with respect to, for example, a change or adjustment in the specification of the screw 2 or service and maintenance thereof, remarkably improve the convenience thereof.

It should be noted that in this embodiment, the structure for whirl-stop and fixation of the plurality of cylinder bodies 13 and rotating shaft 14 is not limited to the structure associated with the combination of the key 17 and groove 19, and a spline structure (not shown) may be used instead.

Furthermore, the segment type screw 2 is coaxially accommodated in the cylinder 3 of the barrel 4. More specifically, the screw main body 11 in which the plurality of screw elements are held along the rotating shaft 14 is rotatably accommodated in the cylinder 3. In this state, between the outer circumferential surface of the screw main body 11 (cylinder bodies 13) and inner surface 3s of the cylinder 3, a conveyance path 29 configured to convey the raw material is formed. The conveyance path 29 has an annular cross-sectional shape in the radial direction of the cylinder 3, and extends in the axial direction along the cylinder 3.

In this embodiment, at the part of the screw main body 11 at which the kneading portion 11c is provided, the aforementioned introduction portion 15, first to third conveyance portions 22a, 22b, and 22c configured to convey the raw material introduced by the introduction portion 15, and barrier portion 23 configured to restrict the flow of the raw material are provided. The first to third conveyance portions 22a, 22b, and 22c, and barrier portion 23 are arranged at each of a plurality of positions in the axial direction (longitudinal direction) of the screw main body 11 at the kneading portion 11c.

That is, on the base end side of the screw main body 11 at the kneading portion 11c, the first conveyance portion 22a is arranged. The first conveyance portion 22a is also used as a constituent of the introduction portion 15. In the direction from the first conveyance portion 22a to the leading end of the screw main body 11, the second conveyance portion 22b and third conveyance portion 22c are arranged adjacent to each other. Here, assuming that the first to third conveyance portions 22a, 22b, and 22c constitute one group, the groups concerned and barrier portions 23 are alternately arranged in the axial direction (longitudinal direction) of the screw main body 11.

In one group, the first to third conveyance portions 22a, 22b, and 22c are arranged adjacent to each other. In the direction from the base end of the screw main body 11 to the leading end thereof, the first conveyance portion 22a, second conveyance portion 22b, and third conveyance portion 22c are arranged in the order mentioned. The third conveyance portion 22c is adjacent to the barrier portion 23.

On the other hand, on the leading end side of the screw main body 11 at the kneading portion, a discharge conveyance portion 24 is arranged. The discharge conveyance portion 24 is configured to convey the kneaded stuff kneaded in the cylinder 3 in a direction identical to the direction of conveyance carried out by the other conveyance portions 22a, 22b, and 22c.

The first to third conveyance portions 22a, 22b, and 22c are respectively provided with spirally twisted first to third flights 25a, 25b, and 25c. The first to third flights 25a, 25b, and 25c jut out from the outer circumferential surface of the cylinder body 13 in the circumferential direction thereof toward the conveyance path 29. These flights 25a, 25b, and 25c are twisted in a direction opposite to the rotational direction of the screw main body 11 from the base end of the screw main body 11 to the leading end thereof. In this case, the twist pitch of the second flight 25b is set to a value identical to or smaller than those of the first and third flights 25a and 25c.

The discharge conveyance portion 24 is provided with a spirally twisted flight 26. The flight 26 juts out from the outer circumferential surface of the cylinder body 13 in the circumferential direction thereof toward the conveyance path 29. The flight 26 is twisted in a direction opposite to the rotational direction of the screw main body 11.

It should be noted that when a function of a backflow prevention portion to be described later, i.e., a function of preventing backflow of the raw material is imparted to the second conveyance portion 22b, it is desirable that the twist pitch of the second flight 25b in the second conveyance portion 22b be set smaller than the twist pitch of the third flight 25c in the third conveyance portion 22c.

Here, when the raw material is kneaded by rotating the screw main body 11 in the leftward direction, the flights 25a, 25b, and 25c of the conveyance portions 22a, 22b, and 22c are twisted in such a manner that the raw material is conveyed from the base end of the screw main body 11 toward the leading end thereof. That is, the twisting direction of the flights 25a, 25b, and 25c is set to the clockwise direction as in the case of the right-handed screw.

Furthermore, when the raw material is kneaded by rotating the screw main body 11 in the leftward direction, the flight 26 of the discharge conveyance portion 24 is twisted in such a manner that the raw material is conveyed from the base end of the screw main body 11 toward the leading end thereof. That is, the twisting direction of the flight 26 is set to the clockwise direction as in the case of the right-handed screw.

Conversely, when the raw material is kneaded by rotating the screw main body 11 in the rightward direction, the flights 25a, 25b, and 25c of the conveyance portions 22a, 22b, and 22c are twisted in such a manner that the raw material is conveyed from the base end of the screw main body 11 toward the leading end thereof. That is, the twisting direction of the flights 25a, 25b, and 25c is set to the counterclockwise direction as in the case of the left-handed screw.

Furthermore, when the raw material is kneaded by rotating the screw main body 11 in the rightward direction, the flight 26 of the discharge conveyance portion 24 is twisted in such a manner that the raw material is conveyed from the base end of the screw main body 11 toward the leading end thereof. That is, the twisting direction of the flight 26 is set to the counterclockwise direction as in the case of the left-handed screw.

Each barrier portion 23 includes a spirally twisted flight 41. The flight 41 juts out from the outer circumferential surface of the cylinder body 13 in the circumferential direction thereof toward the conveyance path 29. The flight 41 is twisted in a direction identical to the rotational direction of the screw main body 11.

Here, when the raw material is kneaded by rotating the screw main body 11 in the leftward direction, the flight 41 of each barrier portion 23 is twisted in such a manner that the raw material is conveyed from the leading end of the screw main body 11 toward the base end thereof. That is, the twisting direction of the flight 41 is set to the counterclockwise direction as in the case of the left-handed screw.

Conversely, when the raw material is kneaded by rotating the screw main body 11 in the rightward direction, the flight 41 of each barrier portion 23 is twisted in such a manner that the raw material is conveyed from the leading end of the screw main body 11 toward the base end thereof. That is, the twisting direction of the flight 41 is set to the clockwise direction as in the case of the right-handed screw.

In each barrier portion 23, the twist pitch of the flight 41 is set to a value identical to or smaller than those of the flights 25a, 25b, 25c, and 26 in the aforementioned conveyance portions 22a, 22b, 22c, and 24. Furthermore, between the top parts of the flights 25a, 25b, 25c, 26, and 41 and inner surface 3s of the cylinder 3, a small clearance is secured.

Each barrier portion 23 according to this embodiment is designed to enable the raw material to flow over each barrier portion 23. In other words, each barrier portion 23 according to this embodiment is designed in such a manner that the raw material can pass through the gap between each barrier portion 23 and cylinder 3 in a state where the extruder screw 2 is rotatably inserted in the cylinder 3 of the barrel 4. In this case, it is desirable that a gap 27 (see FIG. 8) between an outer diameter portion 23s of each barrier portion 23 and inner surface 3s of the cylinder 3 be set within a range greater than or equal to 0.05 mm and smaller than or equal to 2 mm. Furthermore, more desirably, the gap 27 is set within a range greater than or equal to 0.05 mm and smaller than or equal to 0.7 mm.

Figure 20:
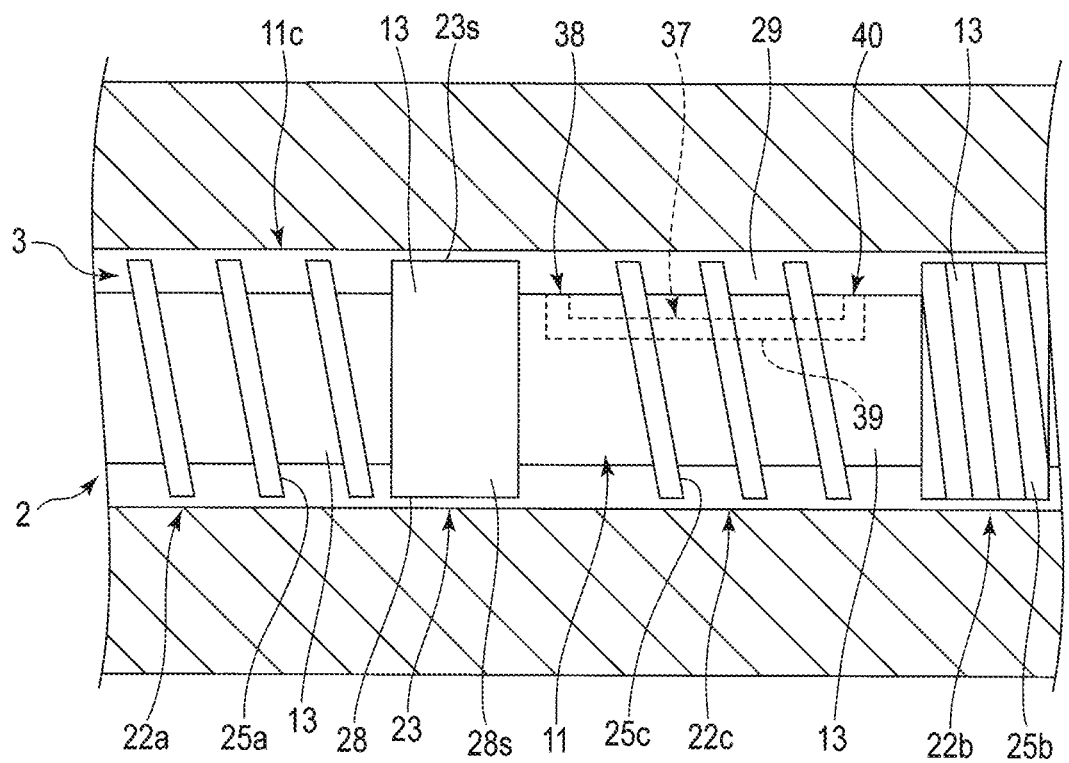
FIG. 20 is a cross-sectional view showing the external configuration of an extruder screw according to a modification example of the present invention.
Figure 21:
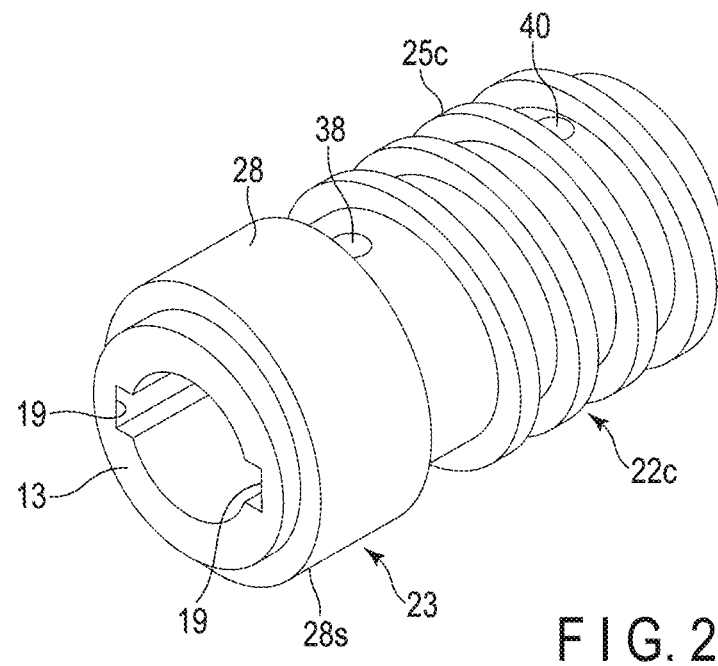
FIG. 21 is a perspective view showing the barrier annular body shown in FIG. 20 in a partially enlarging manner.

It should be noted that in each barrier portion 23, instead of providing the flight 41, a barrier annular body 28 (see FIG. 20 and FIG. 21) continuous in the circumferential direction along the outer circumferential surface of the screw main body 11 may be provided. The barrier annular body 28 includes a cylindrical surface 28s coaxially continuous in the circumferential direction around the axis line 10. The cylindrical surface 28s juts out from the outer circumferential surface of the cylinder body 13 in the circumferential direction thereof toward the conveyance path 29. The gap between the cylindrical surface 28s and inner surface 3s of the cylinder 3 is set within the range of the aforementioned gap 27.

Incidentally, the length of each of the conveyance portions 22a, 22b, 22c, and 24 in the axial direction of the screw main body 11 is appropriately set according to, for example, the type of the raw material, degree of kneading of the raw material, amount of production of the kneaded stuff per unit time, and the like. Although each of the conveyance portions 22a, 22b, 22c, and 24 is at least an area in which each of the flights 25a, 25b, 25c, and 26 is formed on the outer circumferential surface of the cylinder body 13, the area is not particularly limited to an area between the starting point and ending point of each of the flights 25a, 25b, 25c, and 26.

That is, at the outer circumferential surface of the cylinder body 13, the part of the surface outside the extent of each of the flights 25a, 25b, 25c, and 26 is also regarded as the part of each of the conveyance portions 22a, 22b, 22c, and 24 in some cases. For example, when a cylindrical spacer or cylindrical collar is arranged at a position adjacent to the cylinder body 13 including each of the flights 25a, 25b, 25c, and 26, there can be a case where the spacer or collar is included in each of the conveyance portions 22a, 22b, 22c, and 24.

Further, the length of the barrier portion 23 in the axial direction of the screw main body 11 is appropriately set according to, for example, the type of the raw material, degree of kneading of the raw material, amount of production of the kneaded stuff per unit time, and the like. The barrier portion 23 functions in such a manner that the flow of the raw material conveyed by the conveyance portions 22a, 22b, and 22c is temporarily dammed up. That is, the barrier portion 23 is configured to be adjacent to the third conveyance portion 22c on the downstream side in the conveyance direction of the raw material, and restrict the passage of the raw material conveyed by the conveyance portions 22a, 22b, and 22c through the aforementioned gap 27.

At the part of the screw 2 (screw main body 11) at which the kneading portion 11c is provided, the flights 25a, 25b, 25c, 26, and 41, and barrier annular body 28 (cylindrical surface 28s) jut out from the outer circumferential surfaces of the plurality of cylinder bodies 13 each having the identical outer diameter D1 toward the conveyance path 29. Accordingly, the outer circumferential surface of each cylinder body 13 in the circumferential direction thereof defines the root diameter of the screw 2 at the kneading portion 11c. The root diameter coincides with the aforementioned outer diameter D1, and is held at a fixed value throughout the total length of the screw main body 11 at the part thereof at which the kneading portion 11c is provided.

In this case, in order that the depth of the root may become smaller, the root diameter of the kneading portion 11c may be made larger. According to such a configuration, it is possible to stably discharge the kneaded stuff created by the screw 2 from the discharge port 7. It should be noted that the depth of the root can be defined as a height dimension from the outer circumferential surface of the screw main body 11 (cylinder body 13) to the outer diameter of each of the flights 25a, 25b, 25c, 26, and 41, and barrier annular body 28 (cylindrical surface 28s) in the radial direction.

Furthermore, at the part of the screw main body 11 at which the kneading portion 11c is provided, a plurality of paths 37 extending in the axial direction are provided inside the part. The plurality of paths 37 may be formed in such a manner that the paths 37 are arranged in the circumferential direction of the screw main body 11 with intervals held between them or may be arranged in the axial direction with intervals held between them. In the drawing, as an example, a configuration in which a plurality of paths 37 are arranged at regular intervals in the axial direction of the screw main body 11 (kneading portion 11c) is shown.

Each path 37 is provided at a position deviated from the axis line 10 which is the rotational center of the screw 2. That is the path 37 is off the axis line 10. Accordingly, the path 37 revolves around the axis line 10 with the rotation of the screw main body 11.

Regarding the shape of the path 37, as the cross-sectional shape thereof, for example, a circular shape, rectangular shape, elliptical shape, and the like can be set if the shapes are passable for the raw material. In the drawing, as an example, a path 37 which is a hole having a circular cross-sectional shape is shown. In this case, it is desirable that the inner diameter (bore) of the hole be set to a value greater than or equal to 1 mm and smaller than 6 mm. More desirably, the inner diameter (bore) of the hole is set to a value greater than or equal to 1 mm and smaller than 5 mm.

Hereinafter, the specific configuration of the aforementioned path 37 will be described.

As shown in FIG. 2 through FIG. 5, in the extruder screw 2 according to this embodiment, inside the screw main body 11 (kneading portion 11c) on which the aforementioned groups (each of which is constituted of the first to third conveyance portions 22a, 22b, and 22c), and plurality of barrier portions 23 are alternately arranged in the axial direction (longitudinal direction), the plurality of paths 37 are arranged in the axial direction (longitudinal direction) with intervals held between them. By virtue of such a screw structure, a screw 2 provided with a screw main body 11 (kneading portion 11c) having a function of continuously imparting shearing action and stretching action to the raw material is realized.

In this embodiment, the path 37 is formed in the cylinder body 13 of the third conveyance portion 22c in the aforementioned group. That is, inside the screw main body 11 (kneading portion 11c), the cylinder body 13 of the third conveyance portion 22c includes a cylindrical wall surface 30 defining the path 37 which is a hole. In this case, the path 37 is a hole constituted of only hollow space. The wall surface 30 continuously surrounds the hollow path 37 in the circumferential direction. Thereby, the path 37 is formed as hollow space allowing passage of only the raw material. In other words, inside the path 37, any elements constituting the screw main body 11 do not exist at all. In this case, the wall surface 30 revolves around the axis line 10 without rotating around the axis line 10 when the screw main body 11 is rotated.

According to such a path 37, when the raw material conveyed through the conveyance path 29 by the conveyance portions 22a, 22b, and 22c flows through the path 37, the "stretching action" happening to the raw material when the raw material passes through the narrow area (path 37) from the wide area (conveyance path 29) can be made to effectively happen. Accordingly, the path 37 is defined as an area (stretching action region) configured to impart stretching action to the raw material.

Here, in the aforementioned screw structure, when attention is given to the third conveyance portion 22c in which the path 37 is formed, and second conveyance portion 22b and barrier portion 23 which are adjacent to the third conveyance portion 22c on both sides thereof, such a configuration can be grasped as one unit which is structurally unified. The one unit has a structure as an axial direction circulation portion configured to circulate the raw material in the axial direction.

The screw main body 11 according to this embodiment is formed in such a manner that the plurality of units concerned are arranged in the axial direction (longitudinal direction), and each of the first conveyance portions 22a is adjacently arranged between the units. Thereby, a screw structure in which the aforementioned axial direction circulation portion is provided at each of a plurality of positions is realized.

In other words, the aforementioned one unit can be grasped as one functionally unified module. As functions of the one module, besides the function of circulating the raw material in the axial direction, for example, a function of imparting shearing action to the raw material, function of imparting stretching action to the raw material, function of restricting conveyance of the raw material by means of the barrier portion 23, function of guiding the raw material the pressure of which is enhanced by the barrier portion 23 to the path 37, function of forming a raw material basin R in which the saturation factor of the raw material is 100% immediately before the barrier portion 23, and the like are conceived.

Furthermore, in the above-mentioned screw structure, the path 37 includes an entrance 38, exit 40, and path main body 39 connecting the entrance 38 and exit 40 to each other. The entrance 38 and exit 40 are provided within a range of one third conveyance portion 22c in the one unit (axial direction circulation portion). Within the range of the third conveyance portion 22c, the entrance 38 is provided on one side (position closer to the leading end of the screw main body 11) of the path main body 39, and exit 40 is provided on the other side (position closer to the base end of the screw main body 11) of the path main body 39.

The formation positions of the entrance 38 and exit 40 can freely be set within the range of the third conveyance portion 22c. For example, when the circulation cycle at the third conveyance portion 22c is made larger, the entrance 38 is made closer to the barrier portion 23, and exit 40 is made closer to the second conveyance portion 22b. In other words, the entrance 38 and exit 40 are made away from each other. Conversely, when the circulation cycle at the third conveyance portion 22c is made smaller, the entrance is made separate from the barrier portion 23, and exit 40 is made separate from the second conveyance portion 22b. In other words, the entrance 38 and exit 40 are made closer to each other. In the drawing, as an example, the configuration in which the circulation cycle is made larger is shown.

The entrance is a hole bored from the outer circumferential surface of the cylinder body 13 (screw main body 11) in the radial direction within the range of the third conveyance portion 22c. The entrance 38 can be formed by, for example, machining using a drill. As a result, the bottom part 38a of the entrance 38 is an inclined surface shaved off into a conical shape by the tip of the drill. In other words, the conical bottom part 38a is an inclined surface widen toward the outer circumferential surface of the screw main body 11.

The exit 40 is a hole bored from the outer circumferential surface of the cylinder body 13 (screw main body 11) in the radial direction within the range of the third conveyance portion 22c. The exit 40 can be formed by, for example, machining using a drill. As a result, the bottom part 40a of the exit 40 is an inclined surface shaved off into a conical shape by the tip of the drill. In other words, the conical bottom part 40a is an inclined surface widen toward the outer circumferential surface of the screw main body 11.

In this embodiment, the third conveyance portion 22c is formed along outer circumferential surfaces of two cylinder bodies 13 adjacent to each other in the axial direction. The path main body 39 is formed to extend through the insides of both the cylinder bodies 13. The path main body 39 is constituted of first and second parts 39a and 39b. The first part 39a is formed in the inside of one cylinder body 13. The second part 39b is formed in the inside of the other cylinder body 13.

In the one cylinder body 13, the first part 39a extends along the axis line 10 in parallel with the axis line 10. One end of the first part 39a is opened at an end face 13a of the cylinder body 13. The other end of the first part 39a is closed by an end wall 13b of the cylinder body 13. Furthermore, the other end of the first part 39a is connected to the entrance 38 described above to communicate with the entrance 38.

In the other cylinder body 13, the second part 39b extends along the axis line 10 in parallel with the axis line 10. One end of the second part 39b is opened at an end face 13a of the cylinder body 13. The other end of the second part 39b is closed by an end wall 13b of the cylinder body 13. Furthermore, the other end of the second part 39b is connected to the exit 40 described above to communicate with the exit 40.

The path main body 39 can be formed by constricting the cylinder body 13 in which the first part 39a is formed, and the cylinder body 13 in which the second part 39b is formed in the axial direction to thereby bring their end faces 13a into close contact with each other. In this state, the path 39 linearly and continuously extends in the axial direction of the screw main body 11 without branching halfway. Further, both sides of the path main body 39 are connected to the entrance 38 and exit 40 to communicate with the entrance 38 and exit 40.

In this case, the bore of the path main body 39 may be set smaller than the bores of the entrance 38 and exit 40 or may be set identical to the bores. In either case, the path cross-sectional area defined by the bore of the path main body 39 is set far smaller than the annular cross-sectional area of the aforementioned conveyance path 29 in the radial direction.

In this embodiment, each cylinder body 13 on which at least part of each of the flights 25a, 25b, 25c, 26, and 41 is formed can be grasped as a screw element corresponding to each of the conveyance portions 22a, 22b, 22c, and 24, and barrier portion 23. In FIG. 4, as an example of the screw element, the cylinder body 13 of the third conveyance portion 22c provided with the aforementioned path 37 (entrance 38, path main body 39, and exit 40) is shown. In the third conveyance portion 22c, the entrance 38 and exit 40 are formed in the outer circumferential surface of the cylinder body 13.

Figure 6:
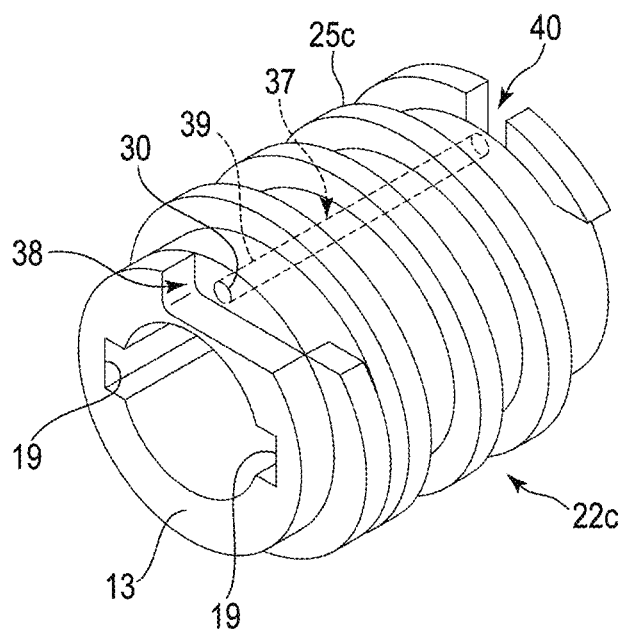
FIG. 6 is a perspective view showing another configuration example of the screw element of the extruder screw.

It should be noted that as another configuration of the path 37, as shown in, for example, FIG. 6, the path main body 39 may be formed by penetrating the cylinder body 13 in the axial direction. In this case, the entrance 38 and exit 40 are formed by partially cutting away both end faces of the cylinder body 13 in the axial direction to thereby form concave parts. According to such a configuration, it is possible to form a complete path main body 39 by only forming a perforated horizontal hole in the cylinder body 13.

According to such an element structure, it is possible to form the kneading portion 11c of the screw main body 11 by arranging a plurality of screw elements (cylinder bodies 13) in sequence along the rotating shaft 14. Accordingly, it is possible to, for example, exchange or rearrange the conveyance portions 22a, 22b, 22c, and 24, and barrier portion 23 according to the degree of kneading of the raw material, and easily carry out the work for the exchange and rearrangement.

Furthermore, the plurality of cylinder bodies 13 serving as the screw elements are constricted in the axial direction to be brought into close contact with each other, whereby the path main body 39 of each path 37 is formed, and the part from the entrance 38 of the path 37 to the exit 40 thereof is made integrally continuous through the path main body 39. Accordingly, in forming the path 37 in the screw main body 11, it is advisable to subject each of the cylinder bodies 13 each having lengths sufficiently shorter than the total length of the screw main body 11 (kneading portion 11c) to machining for forming the path 37. Accordingly, it becomes easy to carry out machining, and carry out handling at the time of forming the path 37.

Furthermore, in the screw structure of the extruder screw 2, the aforementioned introduction portion 15 has a structure configured to continuously introduce the raw material conveyed from the melting and mixing portion 11b into the kneading portion 11c. In FIG. 1 and FIG. 2, an example of such an introduction structure is shown. That is, the introduction portion 15 is formed by utilizing the first conveyance portion 22a arranged on the upstream side in the conveyance direction in the aforementioned group (first to third conveyance portions 22a, 22b, and 22c). In the introduction portion 15, on the outer circumferential surface of the cylinder body 13, a spirally twisted first flight 25a is provided. The first flight 25a is twisted in a direction opposite to the rotational direction of the screw main body 11.

According to such an introduction structure, it is possible to continuously introduce the raw material conveyed from the melting and mixing portion 11b into the kneading portion 11c by means of the first flight 25a of the introduction 15 (first conveyance portion 22a).

In the kneading portion 11c, the aforementioned axial direction circulation portion (second conveyance portion 22b, third conveyance portion 22c, barrier portion 23, and path 37) is provided at each of a plurality of positions. In each axial direction circulation portion, the raw material conveyed by the third conveyance portion 22c in the axial direction is restricted in the conveyance thereof by the barrier portion 23, whereby the pressure of the raw material is enhanced. At this time, part of the pressure-enhanced raw material flows into the entrance 38, and thereafter flows through the path main body 39 toward the exit 40. Then, the raw material flowing out of the exit 40 is guided by the second conveyance portion 22b to the outer circumferential surface of the third conveyance portion 22c extending in the circumferential direction thereof. The raw material guided to the outer circumferential surface is conveyed in the axial direction by the third conveyance portion 22c, and thereafter the same operation is repeated.

According to the axial direction circulation portion, to the raw material conveyed by the third conveyance portion 22c in the axial direction, the "shearing action" created by the speed difference between the third flight 25c of the third conveyance portion 22c rotating along the conveyance path 29 and inner surface 3s of the cylinder 3 is imparted, and stirring action incidental to the rotation of the spiral flight 25c itself is also imparted. Furthermore, to the raw material flowing through the path main body 39 from the entrance 38 toward the exit 40, the aforementioned "stretching action" is imparted. Thereby, the degree of kneading for the raw material is enhanced.

Accordingly, a plurality of axial direction circulation portions are provided in the axial direction of the screw main body 11 with interval held between them (for example, at regular intervals), whereby it is possible to realize a screw structure in which shearing action regions and stretching action regions are alternately and consecutively arranged in the axial direction. In the drawing, as an example, an extruder screw 2 having a screw structure in which a plurality of axial direction circulation portions and a plurality of first conveyance portions 22a are alternately arranged in the axial direction is shown.

Furthermore, in the axial direction circulation portion, the twist pitch of the second flight 25b in the second conveyance portion 22b is set smaller than the twist pitch of the third flight 25c in the third conveyance portion 22c, whereby it is possible to impart a function of a backflow prevention portion to the second conveyance portion 22b. In this case, in the second flight 25b of the second conveyance portion 22b, the conveyance capability thereof for conveying the raw material in the conveyance direction is enhanced by an amount corresponding to the reduced amount of the twist pitch. In other words, in the second flight 25b of the second conveyance portion 22b, prevention capability thereof for preventing the raw material from flowing in a direction opposite to the conveyance direction is improved by an amount corresponding to the reduced amount of the twist pitch.

Thereby, the raw material flowing out of the exit 40 of the third conveyance portion 22c is prevented by the second conveyance portion 22b from flowing in a direction opposite to the conveyance direction. At the same time, flow of the raw material flowing out of the exit 40 in the conveyance direction is promoted by the second conveyance portion 22b. As a result, it is possible to efficiently and exhaustively spread the raw material over the entire third conveyance portion 22c in the circumferential direction.

Next, the operation of kneading the raw material by using a single-screw extruder screw 2 will be described below. In this operation description, the "outer circumferential surface of the screw main body 11" implies the outer circumferential surface of the screw main body 11 in the circumferential direction excluding both end faces thereof in the longitudinal direction. Furthermore, in the operation description, a case where kneading is carried out while rotating the extruder screw 2 at a rotational speed of, for example, 50 rpm to 100 rpm counterclockwise in the leftward direction is assumed.

Figure 7:
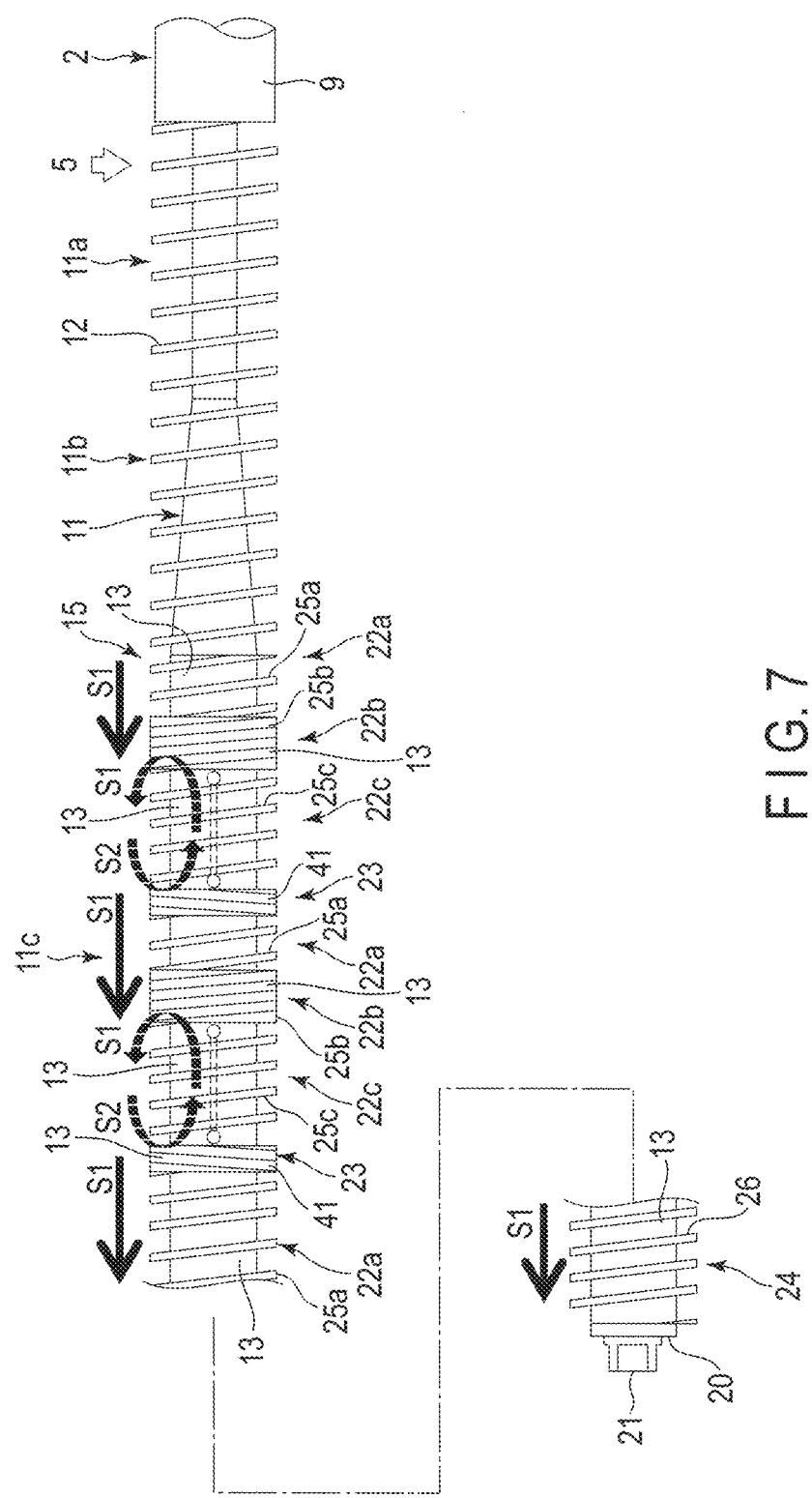
FIG. 7 is view schematically showing the fluidized state of the raw material caused by the extruder screw.

As shown in FIG. 7 and FIG. 8, materials 6 (see FIG. 1) are supplied from the supply port 5 to the cylinder 3 in a state where the extruder screw 2 is rotated in the leftward direction.

The pellet-like resin supplied to the cylinder 3 is conveyed from the transfer portion 11a to the melting and mixing portion 11b by the flight 12. In the melting and mixing portion 11b, the resin receives compression mainly from the continuously narrowed gap while being heated by the heater. As a result, the raw material formed by melting and mixing two types of resins is conveyed from the melting and mixing portion 11b.

The raw material conveyed from the melting and mixing portion 11b is continuously introduced into the kneading portion 11c by the introduction portion 15 (first conveyance portion 22a). At this time, the raw material is continuously supplied to the outer circumferential surface of the screw main body 11 at the kneading portion 11c. The supplied raw material is conveyed from the base end of the screw main body 11 toward the leading end thereof in the direction S1 by the first to third flights 25a, 25b, and 25c of the first to third conveyance portions 22a, 22b, and 22c.

While the raw material is conveyed in the direction S1, the "shearing action" created by the speed difference between the flights 25a, 25b, and 25c of the conveyance portions 22a, 22b, and 22c rotating along the conveyance path 29 and inner surface 3s of the cylinder 3 is imparted to the raw material, and stirring action incidental to the rotation of the spiral flights 25a, 25b, and 25c themselves is also imparted to the raw material. Thereby, the degree of kneading for the raw material is enhanced.

The raw material conveyed in the direction S1 is restricted in the conveyance thereof by the barrier portion 23. That is, the flight 41 of the barrier portion 23 acts to convey the raw material in the direction opposite to the direction S1, i.e., to convey the raw material from the leading end of the screw main body 11 toward the base end thereof. As a result, the raw material is restricted in the flow thereof by the barrier portion 23.

The flow of the raw material is restricted, whereby the pressure applied to the raw material is enhanced. More specifically, in FIG. 8, the saturation factor of the raw material of the part corresponding to the third conveyance portion 22c of the screw main body 11 in the conveyance path 29 is expressed by gradation. That is, in the conveyance path 29, the thicker the tone, the higher the saturation factor of the raw material is. As is evident from FIG. 8, in the conveyance path 29 corresponding to the third conveyance portion 22c, the saturation factor of the raw material becomes higher from an off position to the barrier portion 23. The saturation factor of the raw material is 100% immediately before the barrier portion 23.

Accordingly, a "raw material basin R" in which the saturation factor of the raw material becomes 100% is formed immediately before the barrier portion 23. In the raw material basin R, the flow of the raw material is restricted, whereby the pressure of the raw material is raised. The raw material the pressure of which is raised continuously flows into the path main body 39 from the entrance 38 opened at the outer circumferential surface of the third conveyance portion 22c (cylinder body 13) and, then flows through the inside of the path main body 39 in a direction S2 from the leading end of the screw main body 11 toward the base end thereof, the direction S2 being opposite to the direction S1.

As described above, the path cross-sectional area defined by the bore of the path main body 39 is far smaller than the annular cross-sectional area of the conveyance path 29 in the radial direction of the cylinder 3. According to another grasping method, the spread area based on the bore of the path main body 39 is far smaller than the spread area of the annular conveyance path 29. Accordingly, when flowing into the path main body 39 from the entrance 38, the raw material is abruptly narrowed, whereby "stretching action" is imparted to the raw material.

Furthermore, the path cross-sectional area is sufficiently smaller than the annular cross-sectional area, and hence the raw material collected in the raw material basin R is never exhausted. That is, part of the raw material collected in the raw material basin R continuously flows into the entrance 38. During this time, the new raw material is fed to the barrier portion 23 by the third flight 25c of the third conveyance portion 22c. As a result, the saturation factor in the raw material basin R immediately before the barrier portion 23 is kept at 100% at all times. At this time, even when some variation in the amount of conveyance by the third flight 25c occurs, the variation state is absorbed by the raw material remaining in the raw material basin R. Thereby, it is possible to continuously and stably supply the raw material to the path main body 39. Accordingly, in the path main body 39, it is possible to incessantly and continuously impart stretching action to the raw material.

The raw material passing through the path main body 39 flows out of the exit 40 to the outer circumferential surface of the screw main body 11. The raw material flowing out of the exit 40 is guided to the outer circumferential surface of the third conveyance portion 22c extending in the circumferential direction thereof by the second conveyance portion 22b having the function of a backflow prevention portion.

The raw material guided to the outer circumferential surface is conveyed in the direction S1 by the third conveyance portion 22c. The raw material conveyed in the direction S1 is restricted in the conveyance thereof by the barrier portion 23, whereby the raw material flows into the entrance 38, and thereafter the operation identical to the above operation is repeated.

While such an operation is repeated, part of the raw material the flow of which is restricted by the barrier portion 23 passes through a gap 27 between the outer diameter portion 23s of the barrier portion 23 and inner surface 3s of the cylinder 3 and is fed to the first conveyance portion 22a adjacent to the barrier portion 23 on the downstream side of the barrier portion 23.

In the screw main body 11 (kneading portion 11c), the aforementioned conveyance portions 22a, conveyance portions 22b, conveyance portions 22c, and barrier portions 23 are alternately arranged in the axial direction. In other words, the aforementioned axial direction circulation portions and first conveyance portions 22a are alternately arranged in the axial direction. Accordingly, the aforementioned series of shearing/stretching action is repeated. Thereby, the raw material in the cylinder 3 is continuously conveyed from the base end of the screw main body 11 (kneading portion 11c) toward the leading end thereof in a state where the shearing flow and stretching flow are repeated. As a result, the degree of kneading of the raw material is enhanced.

Further, the conveyed kneaded stuff is conveyed in the direction S1 by the flight 26 of the discharge conveyance portion 24, and is thereafter continuously extruded from the discharge port 7 (see FIG. 1 and FIG. 2).

As described above, according to this embodiment, the function of imparting stretching action to the raw material is given to the extruder screw 2 itself, whereby it is possible to enhance the degree of kneading of the raw material without lengthening the screw 2 or single-screw extruder.

According to this embodiment, it is possible to continuously impart shearing action and stretching action to the raw material a plurality of times. Accordingly, it is possible to increase the number of times and length of time of imparting the shearing action and stretching action to the raw material. As a result, it is possible to more accurately control the degree of kneading than in the case of using the conventional method.

According to this embodiment, in an already-existing extruder screw provided with a supply portion, compression portion, and measuring portion from the base end thereof toward the leading end thereof in the order mentioned, and having no paths through which the raw material flows inside the screw, the supply portion is replaced with a transfer portion 11a, compression portion is replaced with a melting and mixing portion 11b, and measuring portion is replaced with a kneading portion 11c in which a combination of a conveyance portion 22, barrier portion 23, and path 37 is arranged. Thereby, it is possible to make the already-existing extruder screw possess both a function of imparting shearing action to the raw material, and function of imparting stretching action to the raw material. As a result, it is possible to realize an extruder screw in which handling facility is maintained and improved.

According to this embodiment, at the part at which the kneading portion 11c is provided, the outer diameter D1 of the screw main body 11 (each cylinder body 13) is set to a fixed value, i.e., the root diameter of the screw 2 is set to a fixed value, whereby it is possible to realize a segment type screw 2 in which a plurality of screw elements can be held in an arbitrary order and combination. By segmenting the screw 2, it is possible to remarkably improve the convenience thereof with respect to, for example, a change or adjustment in the specification of the screw 2 or service and maintenance thereof.

Furthermore, according to this embodiment, the cross-sectional area of the path 37 (path main body 39) is set far smaller than the cross-sectional area of the conveyance path 29 configured to convey the raw material, whereby it is possible to uniformly, stably, and efficiently impart stretching action to the raw material passing through the path 37 (path main body 39).

Up to this point, although an embodiment of the present invention has been described, the present invention is not limited to the one embodiment, and the following modification examples are also included in the technical scope of the present invention.

In the embodiment described above, in FIG. 2 and FIG. 5, the path 37 joined to the entrance 38 and exit 40 at positions off the bottom parts 38a and 40a of the entrance 38 and exit 40 is shown. However, the joining relationship between the path main body 39 and entrance 38 or exit 40 is not limited to the one embodiment described above, and the following joining relationships are also included in the technical scope of the present invention.

In each of FIG. 9 through FIG. 14, as an example, the path 37 joined to the bottom parts 38a and 40a of the entrance 38 and exit 40 at both ends of the path main body 39 is shown. More specifically, one side of the path main body 39, i.e., the other end of the first part 39a is joined to the bottom part 38a of the entrance 38. Furthermore, the other side of the path main body 39, i.e., the other end of the second part 39b is joined to the bottom part 40a of the exit 40.

In each of FIG. 9 (A) and FIG. 9 (B), and FIG. 10 (A) and FIG. 10 (B), the path 37 according to a first modification example is shown. In the path 37, an end face of one side (the other end of the first part 39a) of the path main body 39 is joined to the bottom part 38a of the entrance 38. In the bottom part 38a, one opening 38b communicating with the path main body 39 (first part 39a) is formed. On the other hand, an end face of the other side (the other end of the second part 39b) of the path main body 39 is joined to the bottom part 40a of the exit 40. In the bottom part 40a, one opening 40b communicating with the path main body 39 (second part 39b) is formed.

The one opening 38b of the entrance 38 is formed in an area opposed to the bottom part 38a having a shape widen toward the outer circumferential surface of the screw main body 11. On the other hand, the one opening 40b of the exit 40 is formed in an area opposed to the bottom part 40a having a shape widen toward the outer circumferential surface of the screw main body 11.

In this case, the raw material flowing into the entrance 38 is guided to the opening 38b along the inclined surface of the bottom part 38a. As a result, all of the raw material continuously and smoothly flows into the path main body 39 without stagnating inside the entrance 38. The raw material passing through the path main body 39 subsequently flows into the exit 40. The raw material flowing into the exit 40 is guided to the outer circumferential surface of the screw main body 11 along the inclined surface of the bottom part 40a. As a result, all of the raw material continuously and smoothly flows out to the outer circumferential surface of the screw main body 11 without stagnating inside the exit 40.

Thereby, it is possible to impart stretching action to the raw material passing through the path 37 without any omission, uniformly, and continuously while preventing the raw material from locally stagnating inside the path 37.

Figures 11A, 11B:
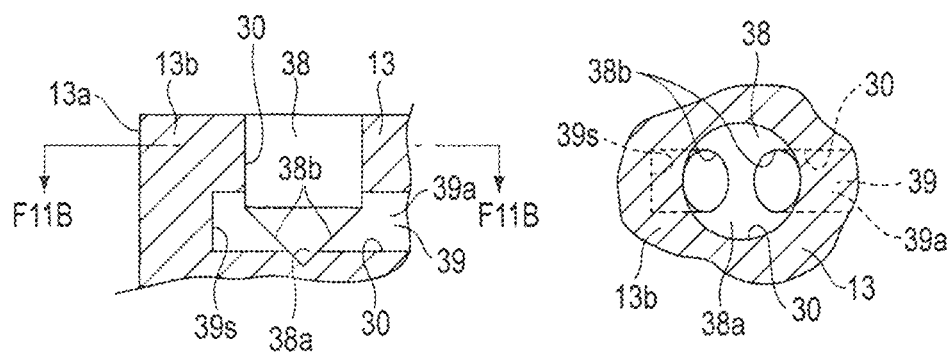
FIG. 11 (A) is a cross-sectional view showing the configuration of an entrance part of the path in an enlarging manner in a modification example of the present invention, and FIG. 11 (B) is a cross-sectional view along line F11B-F11B in FIG. 11 (A).
Figures 12A, 12B:
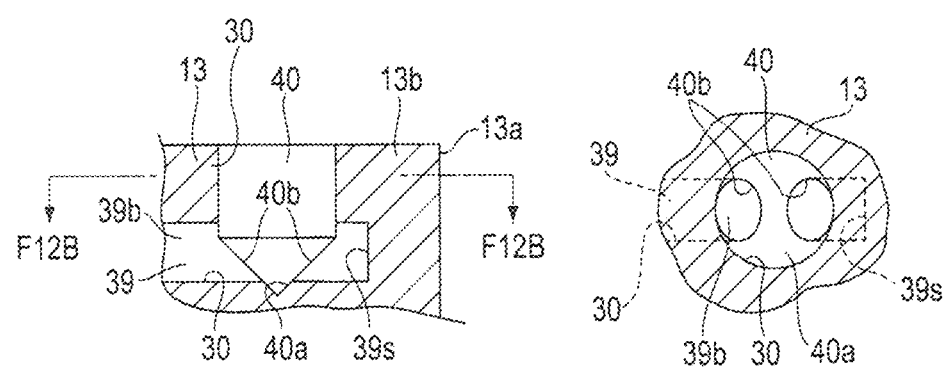
FIG. 12 (A) is a cross-sectional view showing the configuration of an exit part of the path in an enlarging manner in the modification example of the present invention, and FIG. 12 (B) is a cross-sectional view along line F12B-F12B in FIG. 12 (A).

In each of FIG. 11 (A) and FIG. 11 (B), and FIG. 12 (A) and FIG. 12 (B), the path 37 according to a second modification example is shown. In the path 37, the part of the path main body 39 closer to an end face 39s of one side (the other end of the first part 39a) of the path main body 39, i.e., the part just this side of the end face 39s is joined to the bottom part 38a of the entrance 38. In the bottom part 38a, two openings 38b communicating with the path main body 39 (first part 39a) are formed. On the other hand, the part of the path main body 39 closer to an end face 39s of the other side (the other end of the second part 39b) of the path main body 39, i.e., the part just this side of the end face 39s is joined to the bottom part 40a of the exit 40. In the bottom part 40a, two openings 40b communicating with the path main body 39 (second part 39b) are formed.

The two openings 38b of the entrance 38 are formed in an area opposed to the bottom part 38a having a shape widen toward the outer circumferential surface of the screw main body 11. On the other hand, the two openings 40b of the exit 40 are formed in an area opposed to the bottom part 40a having a shape widen toward the outer circumferential surface of the screw main body 11. It should be noted that the function and advantage of the path 37 according to the second modification example are identical to the path 37 according to the first modification example, and hence descriptions of them are omitted.

In the one embodiment, and modification examples described above, as the opening direction of the entrance 38 and exit 40, although the direction perpendicular to the axis line 10 is assumed, the direction is not limited to this. As shown in, for example, FIG. 13 (A) and FIG. 13 (B), and FIG. 14 (A) and FIG. 14 (B), the opening directions of the entrance 38 and exit 40 may be set to the directions (directions indicated by dotted lines) intersecting the axis line 10. In this case, openings may be formed in a plurality of directions from both sides of the path main body 39 to thereby provide a plurality of entrances 38 and 38-1, and a plurality of exits 40 and 40-1.

Furthermore, regarding the entrance 38, it is desirable that the entrance 38 be formed in such a manner that the entrance 38 is made sunken below the outer circumferential surface of the screw main body 11. Thereby, it is possible to make the raw material flow into the entrance 38 more easily.

Furthermore, in the embodiment and modification examples described above, although a path 37 provided with a path main body 39 parallel to the axis line 10 is assumed, the path 37 is not limited to this, and a path 37 provided with a path main body 39 intersecting the axis line 10 is also included in the technical scope of the present invention. For example, the exit 40 is eliminated, whereby the other side of the path main body 39 one side of which is joined to the entrance 38 is directly opened to the outer circumferential surface of the screw main body 11 (cylinder body 13). In this case, the path main body 39 having a gradient rising from one side to the other side is formed.

According to such a configuration, the raw material flowing into the path main body 39 from the entrance 38 receives centrifugal action at the time of the rotation of the screw main body 11, whereby the raw material flows through the path main body 39 more smoothly, and flows out to the outer circumferential surface of the screw main body 11 (cylinder body 13). At this time, stretching action is imparted to the raw material more efficiently and continuously. As a result, it is possible to further enhance the degree of kneading of the raw material.

Further, in the one embodiment described above, although a case where the path 37 (specifically, path main body 39) is formed inside the screw main body 11 (cylinder body 13) at the kneading portion 11c is assumed, in place of this, when the rotating shaft 14 is made to penetrate each cylinder body 13 constituting the screw main body 11 (kneading portion 11c) along the inner circumferential surface of each cylinder body 13, the path 37 (path main body 39) may be formed at the boundary part between each cylinder body 13 and rotating shaft 14. It should be noted that as the configuration of this modification example, the configuration of the part corresponding to FIG. 3 is shown in FIG. 15 through FIG. 18.

Figure 15:
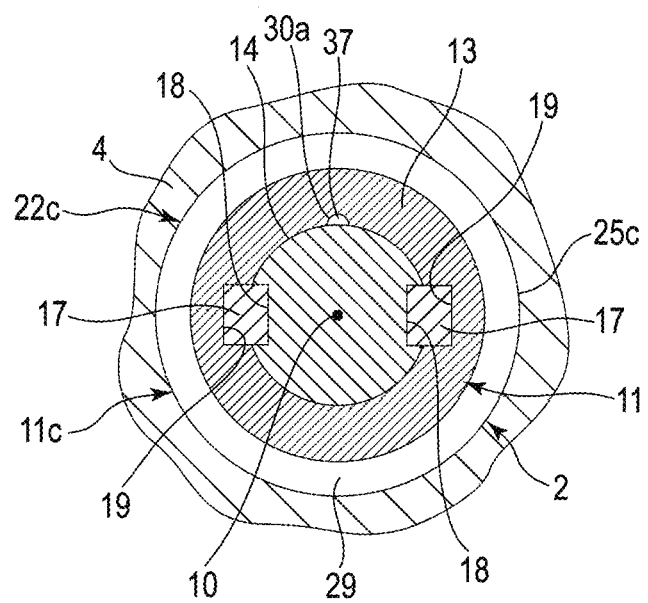
FIG. 15 is a transverse cross-sectional view schematically showing the configuration of the extruder screw in which a path is provided along the inner circumferential surface of a cylinder body constituting a kneading portion in a modification example of the present invention.

The path 37 shown in FIG. 15 is constituted of a wall surface 30a formed by depressing part of the inner circumferential surface of the cylinder body 13 in the axial direction to form a concave shape. In this case, the rotating shaft 14 is made to penetrate the cylinder body 13 along the inner circumferential surface of the cylinder body 13, whereby it is possible to define the path 37 surrounded by the wall surface 30a and outer circumferential surface of the rotating shaft 14.

Figure 16:
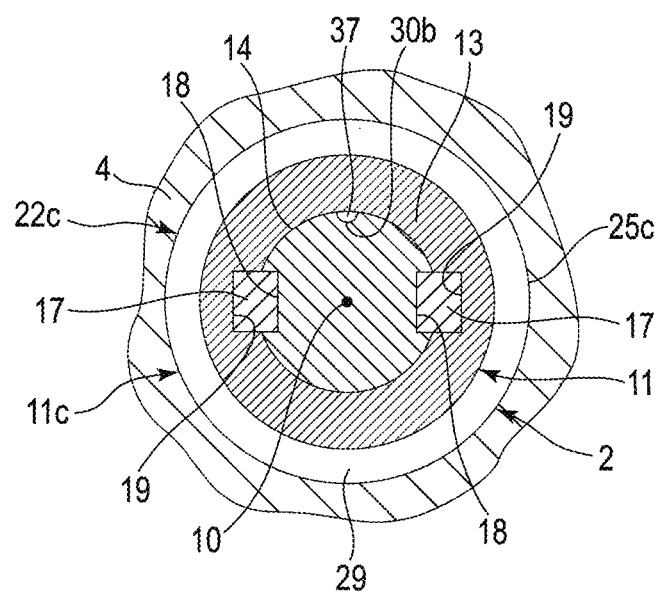
FIG. 16 is a transverse cross-sectional view schematically showing the configuration of the extruder screw in which a path is provided along the outer circumferential surface of a rotating shaft constituting a kneading portion in a modification example of the present invention.

The path 37 shown in FIG. 16 is constituted of a wall surface 30b formed by depressing part of the outer circumferential surface of the rotating shaft 14 in the axial direction to form a concave shape. In this case, the rotating shaft 14 is made to penetrate the cylinder body 13 along the inner circumferential surface of the cylinder body 13, whereby it is possible to define the path 37 surrounded by the wall surface 30b and inner circumferential surface of the cylinder body 13.

Figure 17:
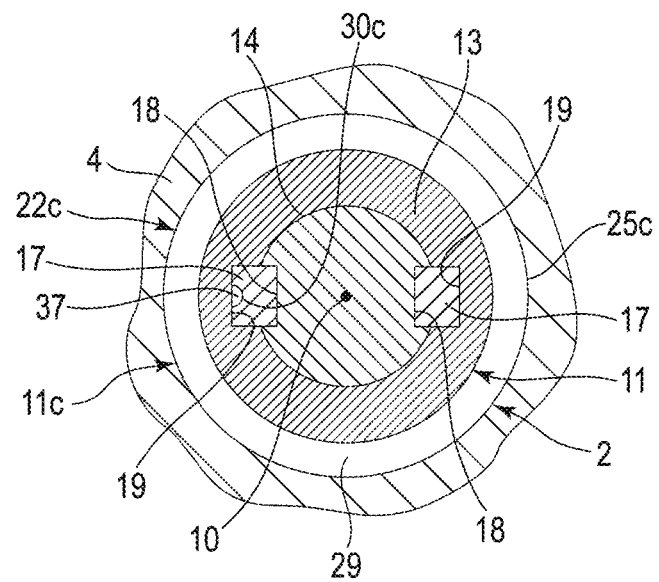
FIG. 17 is a transverse cross-sectional view schematically showing the configuration of the extruder screw in which a path is provided along a surface of a key constituting a kneading portion in a modification example of the present invention.

The path 37 shown in FIG. 17 is constituted of a wall surface 30c formed by depressing part of the outer circumferential surface of the key 17 in the axial direction to form a concave shape. In this case, the rotating shaft 14 is made to penetrate the cylinder body 13 along the inner circumferential surface of the cylinder body 13, whereby it is possible to define the path 37 surrounded by the wall surface 30c and groove bottom surface of the key groove 19.

In any one of the paths 37 described above, by only processing a part exposed to the outside into a concave shape, each of the wall surfaces 30a, 30b, and 30c can be formed, and hence the formation work can easily be carried out. In this case, as the shape of the concave wall surfaces 30a, 30b, and 30c, for example, various shapes such as a semicircular shape, triangular shape, elliptical shape, rectangular shape, and the like can be employed.

Figure 18:
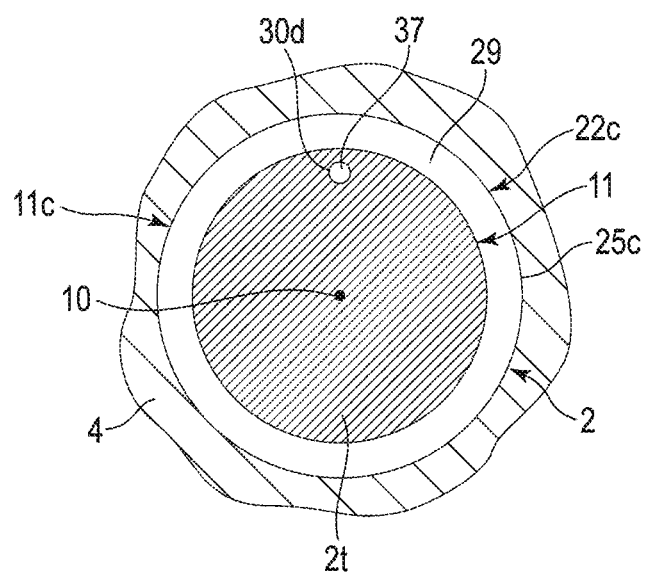
FIG. 18 is a transverse cross-sectional view schematically showing the configuration of the extruder screw in which a screw main body is formed of one shaft-like member in a modification example of the present invention.

Further, in the one embodiment described above, although the part of the screw main body 11 at which the kneading portion 11c is provided is constituted of a plurality of cylinder bodies 13 and rotating shaft 14, in place of this, as shown in FIG. 18, the screw main body 11 (kneading portion 11c) may be constituted of one straight shaft-like member 2t. In this case, the aforementioned conveyance portions and barrier portions are provided on the outer circumferential surface of the solid screw main body 11 (kneading portion 11c), and the aforementioned paths 37 are provided inside the screw main body 11 (kneading portion 11c). It should be noted that in the drawing, as an example, although one of a pair of paths 37 provided at a position deviated from the axis line 10 and defined by a cylindrical wall surface 30d is shown, this does not limit the arrangement of each path 37.

Further, in the one embodiment described above, although a case where a single-screw extruder 1 in which one extruder screw 2 is rotatably inserted in the cylinder 3 of the barrel 4 is assumed, in place of this, to also a twin-screw extruder 34 in which two extruder screws 31 are rotatably inserted in the cylinder 33 of the barrel 32, the technical idea of the present invention is applicable, and the identical advantage can be realized.

Figure 19:
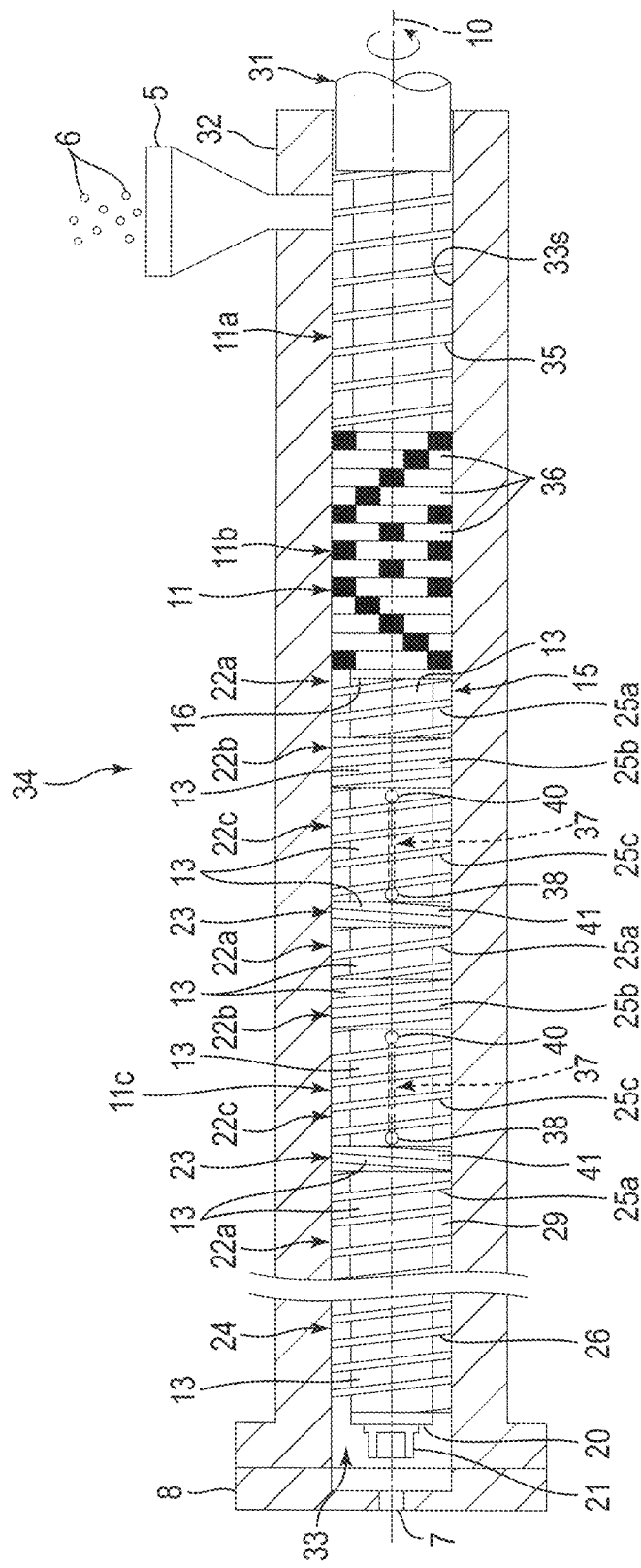
FIG. 19 is a longitudinal cross-sectional view in which the external configuration of an extruder screw is shown in the overall configuration of a twin-screw extruder according to a modification example of the present invention.

In FIG. 19, an example of a twin-screw extruder 34 is shown. In FIG. 19, only one extruder screw 31 of the two extruder screws 31 is shown. The other extruder screw is hidden behind the one extruder screw 31, and hence is not shown.

In the twin-screw extruder 34, the two extruder screws 31 can be rotated in the same direction in a state where the screws 31 are engaged with each other. As in the case of the aforementioned one embodiment, each of the two extruder screws 31 is provided with a screw main body 11 rotating together with the screw 31 in an integrated state. In a state where the extruder screws 31 are engaged with each other, between the screw main bodies 11, a transfer portion 11a, melting and mixing portion 11b, and kneading portion 11c are formed in the order mentioned from the base end of the screw main body 11 toward the leading end thereof.

The transfer portion 11a continuously conveys the plurality of types of materials 6 supplied from the supply port 5 to the inside of the cylinder 3 toward the melting and mixing portion 11b. On the outer circumferential surface of each screw main body 11 at the transfer portion 11a, a spiral flight 35 is continuously formed. The flight 35 is configured to continuously convey the materials 6 supplied from the supply port 5 to the inside of the cylinder 3 from the transfer portion 11a toward the melting and mixing portion 11b. Accordingly, the flight 35 is twisted in a direction opposite to the rotational direction of the screw main body 11.

The melting and mixing portion 11b continuously melts and mixes the materials 6 conveyed thereto from the transfer portion 11a. Each screw main body 11 at the melting and mixing portion 11b is configured to include a plurality of disks 36 adjacent to each other in the axial direction. The plurality of disks 36 are arranged in a state where phase differences are given to disks adjacent to each other.

At the kneading portion 11c, in each screw main body 11, as in the case of the aforementioned one embodiment, the conveyance portions 22a, conveyance portions 22b, conveyance portions 22c, and barrier portions 23 are alternately arranged in line in the axial direction. It should be noted that at the barrel 32, the inner surface 33s of the cylinder 33 is configured to have a shape making it possible to accommodate therein both the two extruder screws 31 in a state where the screws 31 are engaged with each other, and cause the extruder screws 31 to simultaneously rotate in the same direction. Other configurations are identical to the aforementioned one embodiment, and hence descriptions of them are omitted.

According to such a twin-screw extruder 34, in a state where the two extruder screws 31 are rotated in the same direction at a rotational speed of, for example, 100 rpm to 300 rpm, a plurality of types of materials 6 supplied from the supply port 5 to the inside of the cylinder 33 are continuously conveyed from the transfer portion 11a to the melting and mixing portion 11b. In the melting and mixing portion 11b, the materials 6 are continuously melted and mixed. At this time, the melted and mixed materials 6 are turned into a kneading raw material, and the raw material is conveyed from the melting and mixing portion 11b to the kneading portion 11c. Then, the conveyed raw material is introduced into the kneading portion 11c through the aforementioned introduction portion 15, and is thereafter turned into kneaded stuff having an enhanced degree of kneading to thereby be continuously extruded from the discharge port 7.

It should be noted that in the embodiment described above, although the technical idea (extrusion technique for enhancing the degree of kneading) of the present invention is applied to the case where a plurality of materials 6 are to be kneaded, the application is not limited to this, and the technique is also applied to a case where a minute unmelted part is to be prevented from occurring when one type of material is melted, and case where a minute part of a resin in which the resin temperature is non-uniform is to be prevented from occurring.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

REFERENCE SIGNS LIST

2 . . . extruder screw, 10 . . . axis line, 11 . . . screw main body, 11a . . . transfer portion, 11b . . . melting and mixing portion, 11c ... kneading portion, 12 ... flight, 13 ... cylinder body, 14 ... rotating shaft, 15 ... introduction portion, 22a, 22b, and 22c ... conveyance portion, 23 ... barrier portion, 24 ... discharge conveyance portion, 25a, 25b, 25c, and 26 ... flight, 27 ... gap, 28 ... barrier annular body, 29 ... conveyance path, 37 ... path, 38 ... entrance, 39 ... path main body, and 40 ... exit.

What is claimed is:

1. An extruder screw comprising:
   in order from a proximal end of the extruder screw to a distal end thereof:
   a transfer portion configured to continuously convey supplied materials;
   a melting and mixing portion configured to continuously melt and mix the conveyed materials; and
   a kneading portion configured to continuously knead a raw material obtained by melting and mixing the materials, wherein
   the transfer portion, the melting and mixing portion, and the kneading portion are provided on a screw main body rotating around a linear axis line,
   a part of the screw main body in which the kneading portion is provided is composed of a rotating shaft, coaxially extending from a portion in which the melting and mixing portion is provided, and a plurality of cylindrical bodies fitted and supported in the rotating shaft,
   a plurality of conveyance portions conveying the raw materials and a plurality of barrier portions limiting conveyance of the raw materials are alternately arranged on the plurality of cylindrical bodies coaxially connected along the rotating shaft,
   a path is provided in each of the plurality of conveyance portions, inside each of the cylindrical bodies, and includes an entrance and an exit,
   the entrance is opened at an outer circumferential surface of the cylindrical body of a distal end side at the conveyance portion in such a manner that the raw material pressure of which is enhanced by being restricted in conveyance by the barrier portion flows into the entrance,
   the path is formed in such a manner that the raw material flowing into the path from the entrance flows toward the exit in a direction opposite to the direction of conveyance carried out by the conveyance portion, and
   the exit is opened on the circumferential surface of the cylindrical body of a proximal end side in the conveyance portion.

2. The extruder screw of claim 1, wherein
   the part of the screw main body at which the kneading portion is provided is formed in such a manner that an outer diameter of the part becomes a fixed value throughout the total length of the part.

3. An extruder comprising an extruder screw of claim 2, comprising:
   a barrel including a cylinder in which the extruder screw is rotatably inserted;
   a supply port provided on the barrel, and configured to supply materials to the inside of the cylinder; and
   a discharge port which is provided on the barrel, and from which kneaded stuff created by the extruder screw is continuously extruded.

4. An extrusion method comprising:
   kneading a raw material by using an extruder screw of claim 2;
   continuously creating kneaded stuff of the raw material; and
   extruding the kneaded stuff, wherein
   in a kneading portion, while the kneaded stuff is continuously extruded, the raw material conveyed along an outer circumferential surface of a screw main body flows through a path, and thereafter returns to the outer circumferential surface of the extruder screw.

5. The extruder screw of claim 1, wherein a bore of the path is set to a value identical to or smaller than a bore of the entrance of the path.

6. An extruder comprising an extruder screw of claim 5, comprising:
   a barrel including a cylinder in which the extruder screw is rotatably inserted;
   a supply port provided on the barrel, and configured to supply materials to the inside of the cylinder; and
   a discharge port which is provided on the barrel, and from which kneaded stuff created by the extruder screw is continuously extruded.

7. An extrusion method comprising:
   kneading a raw material by using an extruder screw of claim 5;
   continuously creating kneaded stuff of the raw material; and
   extruding the kneaded stuff, wherein
   in a kneading portion, while the kneaded stuff is continuously extruded, the raw material conveyed along an outer circumferential surface of a screw main body flows through a path, and thereafter returns to the outer circumferential surface of the extruder screw.

8. The extruder screw of claim 1, wherein
   a bore of the path is set to a value greater than or equal to 1 mm and smaller than 6 mm.

9. An extruder comprising an extruder screw of claim 8, comprising:
   a barrel including a cylinder in which the extruder screw is rotatably inserted;
   a supply port provided on the barrel, and configured to supply materials to the inside of the cylinder; and
   a discharge port which is provided on the barrel, and from which kneaded stuff created by the extruder screw is continuously extruded.

10. An extrusion method comprising:
    kneading a raw material by using an extruder screw of claim 8;
    continuously creating kneaded stuff of the raw material; and
    extruding the kneaded stuff, wherein
    in a kneading portion, while the kneaded stuff is continuously extruded, the raw material conveyed along an outer circumferential surface of a screw main body flows through a path, and thereafter returns to the outer circumferential surface of the extruder screw.

11. The extruder screw of claim 1, wherein
    the screw main body extends in an axial direction from a base end thereof to be coupled to a rotating device to a leading end thereof,
    the conveyance portion is provided with a flight spirally twisted along the outer circumferential surface of the screw main body, and
    the flight is twisted from the base end of the screw main body toward the leading end thereof in a direction opposite to a rotational direction of the screw main body viewed from the base end side.

12. An extruder comprising an extruder screw of claim 11, comprising:
    a barrel including a cylinder in which the extruder screw is rotatably inserted;

a supply port provided on the barrel, and configured to supply materials to the inside of the cylinder; and a discharge port which is provided on the barrel, and from which kneaded stuff created by the extruder screw is continuously extruded.

13. An extrusion method comprising:

kneading a raw material by using an extruder screw of claim 11;

continuously creating kneaded stuff of the raw material; and extruding the kneaded stuff, wherein in a kneading portion, while the kneaded stuff is continuously extruded, the raw material conveyed along an outer circumferential surface of a screw main body flows through a path, and thereafter returns to the outer circumferential surface of the extruder screw.

14. An extruder comprising an extruder screw of claim 1, comprising:

a barrel including a cylinder in which the extruder screw is rotatably inserted;

a supply port provided on the barrel, and configured to supply materials to the inside of the cylinder; and a discharge port which is provided on the barrel, and from which kneaded stuff created by the extruder screw is continuously extruded.

15. An extrusion method comprising:

kneading a raw material by using an extruder screw of claim 1;

continuously creating kneaded stuff of the raw material; and extruding the kneaded stuff, wherein in a kneading portion, while the kneaded stuff is continuously extruded, the raw material conveyed along an outer circumferential surface of a screw main body flows through a path, and thereafter returns to the outer circumferential surface of the extruder screw.

16. The extrusion method of claim 15, wherein in the kneading portion, the raw material conveyed along the outer circumferential surface of the screw main body is restricted by a barrier portion provided in the kneading portion in the conveyance thereof, whereby the pressure of the raw material is enhanced, and the raw material the pressure of which is enhanced flows into the path from an entrance.

17. The extrusion method of claim 16, wherein in the kneading portion, the raw material flowing into the path from the entrance flows through the inside of the path in a direction opposite to a direction of conveyance carried out by a conveyance portion.

18. The extrusion method of claim 17, wherein in the kneading portion, the raw material passing through the path flows out of an exit to the outer circumferential surface of the screw main body at a position in the conveyance portion in which the entrance is opened on the upstream side of the entrance in the conveyance direction.

\* \* \* \* \*